United States Patent [19]
Graham

[11] Patent Number: 6,129,200
[45] Date of Patent: Oct. 10, 2000

[54] CONFINEMENT TOOLING FOR A VIBRATORY PARTS FEEDER

[76] Inventor: S. Neal Graham, 12997 Fawns Ridge, Fishers, Ind. 46038

[21] Appl. No.: 09/347,601

[22] Filed: Jul. 1, 1999

Related U.S. Application Data

[60] Division of application No. 08/800,652, Feb. 4, 1997, Pat. No. 5,960,929, which is a continuation-in-part of application No. 08/389,241, Feb. 16, 1995, Pat. No. 5,630,497.

[51] Int. Cl.[7] .................................................. B65G 47/24
[52] U.S. Cl. ........................................... 198/380; 198/391
[58] Field of Search ..................................... 198/380, 389, 198/391; 221/160, 167

[56] References Cited

U.S. PATENT DOCUMENTS

| | | | |
|---|---|---|---|
| 2,872,019 | 2/1959 | Owen ........................................ | 198/33 |
| 3,150,762 | 9/1964 | Tricinci ..................................... | 198/33 |
| 3,295,661 | 1/1967 | Mitchell, Jr. et al. ..................... | 198/33 |
| 3,474,890 | 10/1969 | Center ...................................... | 198/33 |
| 3,521,735 | 7/1970 | Gallatin .................................... | 198/33 |
| 3,578,142 | 5/1971 | Burgess, Jr. ............................. | 198/220 |
| 3,907,099 | 9/1975 | Smith ....................................... | 198/220 |
| 4,148,389 | 4/1979 | Dixon ...................................... | 198/389 |
| 4,206,539 | 6/1980 | Weresch .................................. | 29/566.3 |
| 4,436,197 | 3/1984 | MacDonald ............................. | 198/389 |
| 4,450,948 | 5/1984 | Naito et al. ............................. | 198/389 |
| 4,700,827 | 10/1987 | Haaser .................................... | 198/771 |
| 4,709,798 | 12/1987 | Herzog .................................... | 198/380 |
| 4,947,982 | 8/1990 | Miyaki .................................... | 198/391 |
| 5,083,654 | 1/1992 | Nakajima et al. ....................... | 198/444 |
| 5,191,960 | 3/1993 | Wareham ................................. | 198/391 |
| 5,630,497 | 5/1997 | Graham .................................... | 198/380 |
| 5,913,428 | 6/1999 | Graham .................................... | 198/391 |

*Primary Examiner*—Jospeh E. Valenza
*Attorney, Agent, or Firm*—Woodard, Emhardt, Naughton, Moriarty & McNett

[57] ABSTRACT

A vibratory bowl is provided having a number of predetermined attachment locations defined therein. A number of parts orientation units define an equal number of attachment locations which align with the attachment locations of the vibratory bowl. Any of the number of parts orientation units can thus be detachably mounted to a single vibratory bowl having a common configuration. An air supply unit is further provided for directing pressurized air across a parts orientation channel of a parts orientation unit attached to the vibratory bowl. The angle of air supply relative to the parts orientation channel, as well as the height above the parts orientation channel at which the air is supplied, are each adjustable.

26 Claims, 26 Drawing Sheets

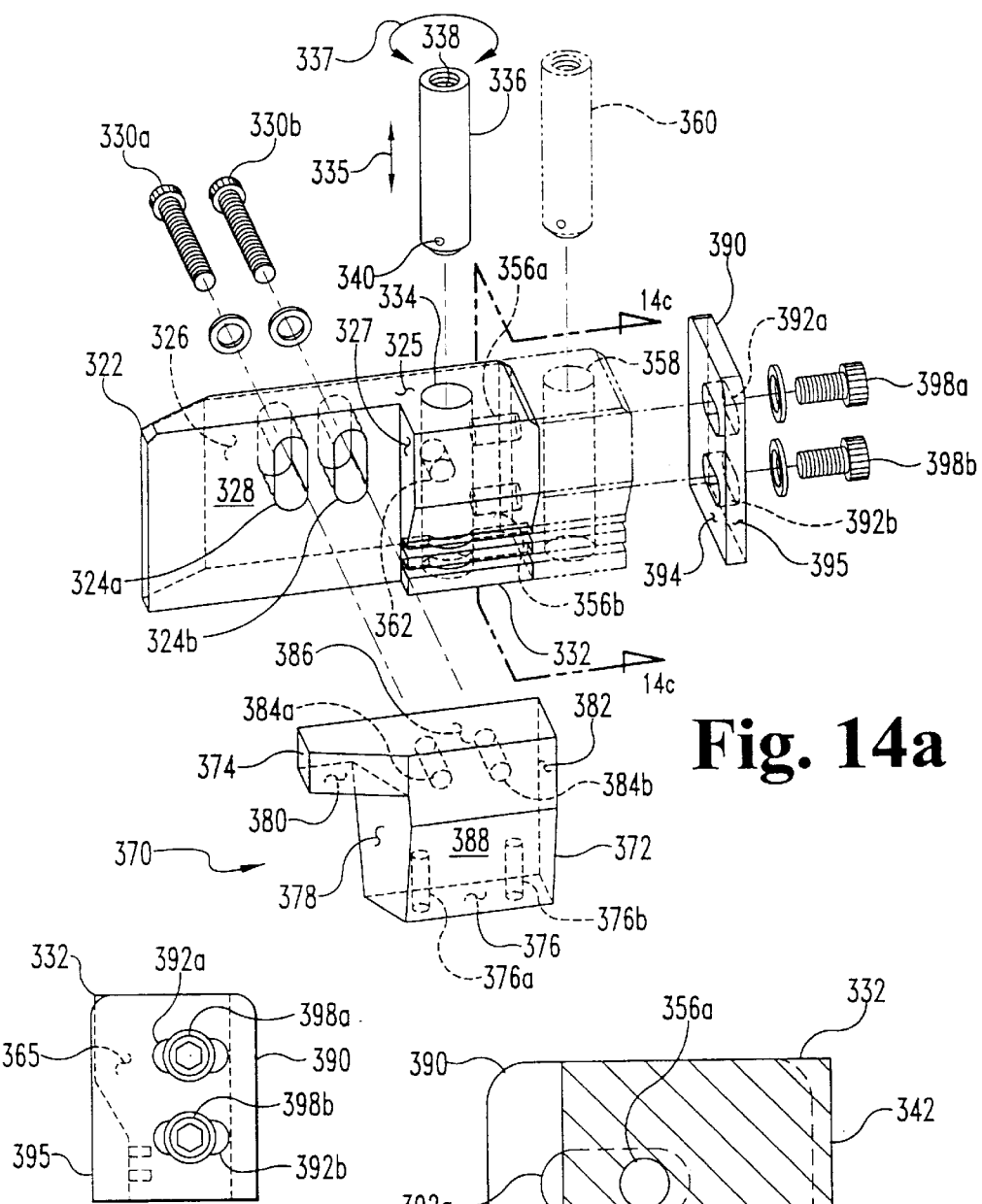
Fig. 14a
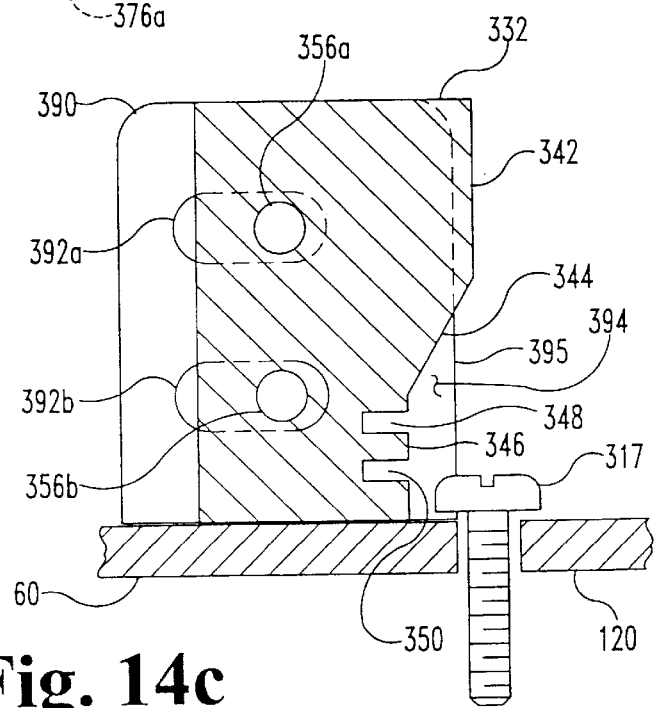
Fig. 14b
Fig. 14c

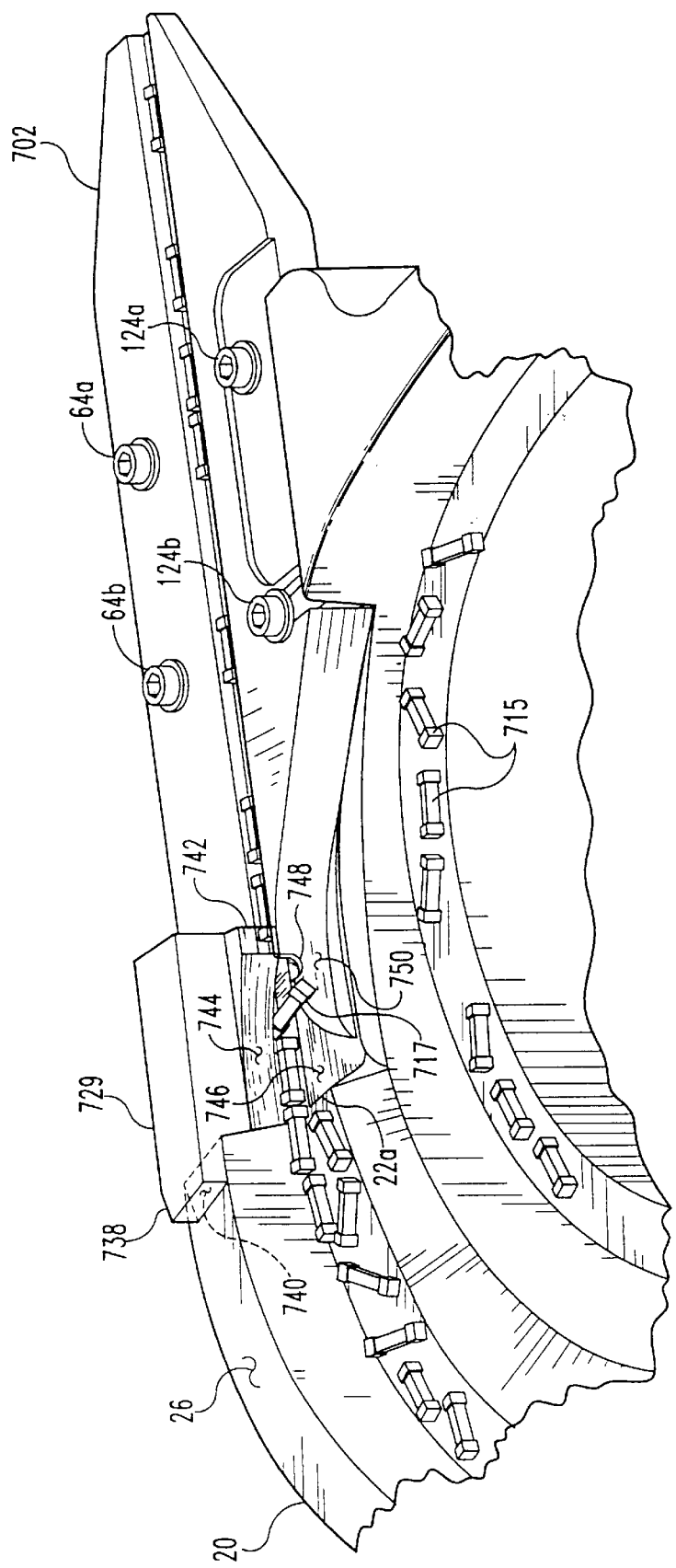

CONFINEMENT TOOLING FOR A VIBRATORY PARTS FEEDER

CROSS-REFERENCE TO RELATED APPLICATION

The present application is a division of application Ser. No. 08/800,652, filed Feb. 4, 1997 and issued Oct. 5, 1999 as U.S. Pat. No. 5,960,929 and entitled CONFINEMENT TOOLING FOR A VIBRATORY PARTS FEEDER, which is a continuation-in-part of application Ser. No. 08/389,241, filed Feb. 16, 1995, and issued May 20, 1997 as U.S. Pat. No. 5,630,497 and entitled VIBRATORY PARTS FEEDER WITH PIVOTAL TOP CONFINEMENT.

FIELD OF THE INVENTION

The present invention generally relates to the field of article feed mechanisms and sorters, and more particularly to vibratory parts feeders.

BACKGROUND OF THE INVENTION

Vibratory parts feeders are commonly known apparata for providing oriented parts from a mass of disoriented parts, or for transporting parts along a processing path. In providing oriented parts, a vibratory parts feeder typically includes a vibratory bowl which is driven by a vibratory drive unit. The bowl is internally configured, typically with a helically oriented path, to transport the parts under vibratory action to a bowl exit location near the top of the bowl.

A variety of mechanisms for orienting the parts are known to be operatively associated with a vibratory bowl apparatus. U.S. Pat. No. 4,436,197, for example, discloses a pair of spaced-apart rails which slope downwardly so that properly oriented parts may slide down the path to the lower section of the track. A gate associated with the track permits only those parts having the desired orientation to continue sliding down the track. U.S. Pat. No. 3,578,142 utilizes a different approach in that the parts transportation path of the bowl is configured to define an adjustable slot for receiving only parts having a particular orientation therein. As the parts are thereafter transported to the exit location near the top of the bowl, the adjustable slot manipulates the parts into the desired orientation.

A common problem associated with serially providing oriented parts from a vibratory bowl is maintaining the orientation of the properly oriented parts under the continuing vibratory action. As a solution to this problem, several vibratory parts feeders utilize some type of top confinement mechanism to minimize further agitation of the oriented parts. For example, U.S. Pat. Nos. 3,907,099, 4,206,539 and 5,191,960 include a downwardly sloped parts track having fixed top surface for confining the orient parts to the track. Other known vibratory parts feeders utilize hinged top confinement structures that are moveable away from their confining positions to thereby allow access to the parts orientation track for clearing jams and performing other maintenance related functions.

Common problems associated with such known hinged confinements include excessive movement of the top confinement mechanism due to inadequate securing of the hinge mechanism, and an adequate lock operable to fixedly position the top confinement member as it is returned to its operating position. Such hinged confinement mechanisms have not gained popularity since, due to the nature of the vibratory action, confinement structures inadequately secured to the vibratory bowl create dead spots and operation inefficiencies that result in fluctuations in feed rate. One solution to the adequate securing problem is disclosed in U.S. Pat. No. 4,700,827 as including a top confinement structure with a series of zero lash hinges at one end and a corresponding series of clasp-type latches at the other. The problem of lack of fixed positioning is not discussed in this reference.

What is therefore needed is a top confinement apparatus that is moveable to permit access to the parts orientation track, but which securely attaches in a repeatably accurate location to the vibratory bowl in its operable position to provide a reliable and accurate top confinement mechanism.

SUMMARY OF THE INVENTION

The present invention overcomes the drawbacks of prior art parts orientation units described in the BACKGROUND section. In accordance with one aspect of the present invention, a vibratory bowl discharge port defines a number of first attachment locations therein at a corresponding number of predetermined locations, wherein the bowl is configured to receive a disoriented mass of parts therein and transport the parts toward the discharge port under vibratory action. A parts receiving unit defines a plurality of second attachment locations therethrough aligned with corresponding ones of the number of first attachment locations wherein each aligned pair of first and second attachment locations are adapted to receive a fasting member therein for detachably mounting the receiving unit to the discharge port. The receiving unit receives parts having a number of orientations from the vibratory bowl and provides the parts with a predetermined orientation. A confining member is mounted to the discharge port and is pivotable between a first position adjacent to the receiving unit and a second position remote from the receiving unit, wherein the confining member is operable in the first position to confine parts in the predetermined orientation.

In accordance with another aspect of the present invention, a vibratory bowl is configured to receive a disoriented mass of parts therein and transport the parts to a discharge port of the bowl under vibratory action. An orienting apparatus is mounted to the discharge port of the bowl and receives parts having a number of orientations from the bowl and provides the parts along a parts orientation track of the orienting apparatus with a predetermined orientation. An air supply unit is further provided and includes a housing having a front surface facing the parts orientation track wherein the housing defines a bore therein and an opening in the front surface extending into the bore. An air supply member having an air inlet adapted for a connection to a supply of pressurized air and an air outlet in fluid communication with the air inlet is disposed within the bore with the air outlet extending through the opening in the front surface of the housing, wherein the air supply unit is operable to supply a stream of pressurized air from the air outlet across the parts orientation track to direct parts having orientations different from the predetermined orientation back into the vibratory bowl. The air outlet is adjustably positionable within the bore to supply the stream of pressurized air across the parts orientation track at any angle within a range of angles relative thereto.

In accordance with yet another aspect of the present invention, a vibratory bowl is configured to receive a disoriented orienting mass of parts therein and transport the parts to a discharge port of the bowl under vibratory action. A receiving unit is mounted to the discharge port and defines an orientation channel therein along longitudinal axis thereof, wherein the orientation channel defines a first portion having a bottom surface angled away from the bowl in a direction perpendicular to the longitudinal axis and a second portion having a substantially flat bottom surface. The first portion transitions to the second portion along a line extending diagonally through the channel, and the first portion receives parts having a number of orientations from the bowl and provides the parts to the second portion with a predetermined orientation. A confining member is mounted to the discharge port and is operable to confine the parts within the channel in the predetermined orientation.

One object of the present invention is to provide a vibratory bowl having a number of predetermined attachment locations defined therein, and a number of parts orientation units having an identical number of attachment locations aligned with the attachment locations within the bowl such that any of the number of parts orientation units may be detachably mounted to a single vibratory bowl configuration.

Another object of the present invention is to provide an air supply unit operable to supply pressurized air across a parts orientation channel of a parts orientation unit attached to a vibratory bowl, wherein the air supply unit includes a high degree of adjustability in both the height above the parts orientation channel at which the pressurized air is supplied and the angle relative to the parts orientation channel at which the pressurized air is directed.

These and other objects of the present invention will become more apparent from the following description of the preferred embodiments.

BRIEF DESCRIPTION OF THE DRAWINGS

FIG. 14*a* is an assembly drawing illustrating various components of the air supply unit of FIG. 13.

FIG. 14*b* is an end elevational view of the air supply unit in FIG. 14*a*.

FIG. 14*c* is a cross-sectional view of the air supply unit of FIG. 14*a* taken along section lines 14*c*—14*c* thereof.

FIG. 26 is a view similar to that of FIGS. 5 and 6 showing further details of the embodiment of FIG. 25.

DESCRIPTION OF THE PREFERRED EMBODIMENTS

Figure 1:
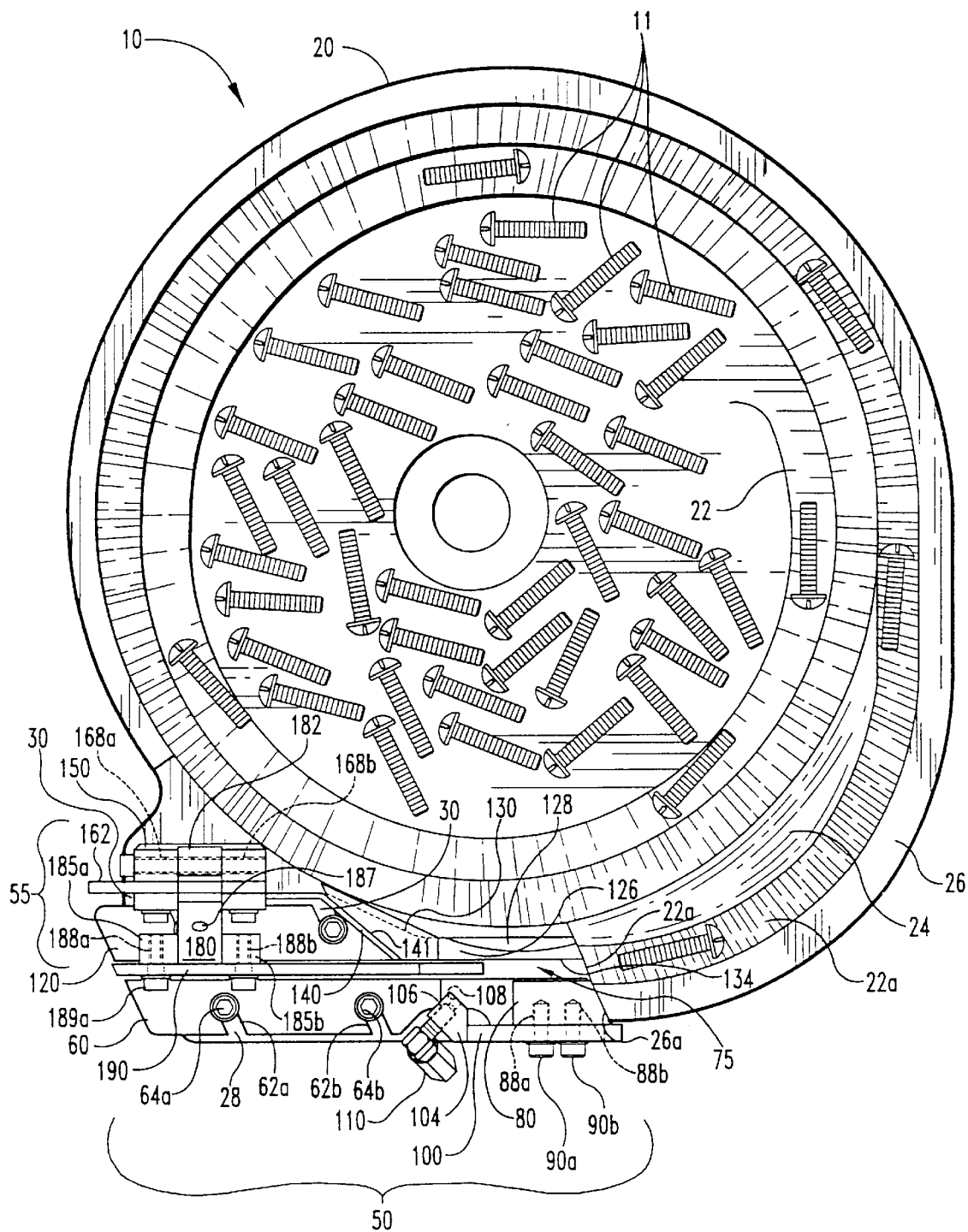
FIG. 1 is a top plan view of a vibratory parts feeder with pivotal top confinement in accordance with one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring now to FIGS. 1–4, a vibratory parts feeder for providing oriented headed parts, in accordance with one embodiment of the present invention, is shown. The vibratory parts feeder 10 may be used to orient a variety of headed parts including, for example, screws, nails, bolts, rivets, and the like. The parts feeder 10 generally includes a vibratory bowl 20 having a helical parts track 22 defined therein, and a parts orientation unit 50 which includes a pivotal top confinement apparatus 55.

As is commonly known in the industry, vibratory bowl 20 is actuated by a vibratory drive unit (not shown) to thereby cause disoriented parts 11 contained within the bowl 20 to travel up the helical parts path 22, to a parts discharge port 22a. In a preferred embodiment, vibratory bowl 20 is a polycast bowl, although the present invention contemplates that vibratory bowl 20 may be constructed from other suitable materials such as, for example, stainless steel. As is common with many vibratory bowls, the parts track 22 includes a sloped portion 24 located near the discharge port 22a, so that certain disoriented parts, such as side-by-side or sideways parts, will slide back into the interior of the bowl 20. Additionally, the bowl 20 includes an upper rim 26 which is positioned sufficiently above the parts track 22 to keep the parts from being ejected from the bowl 20 under the vibratory action. Vibratory bowl 20 further defines a parts orientation member 25 extending from the discharge port 22a. Parts orientation member 25 includes surfaces 28, 30, 34, and 36 for mounting the parts orientation unit 50 and pivotal top confinement apparatus 55 thereto.

Parts orientation unit 50 includes a pair of parallel blades 60 and 120 which define an adjustable-width channel 75 therebetween for orienting the headed parts in a manner to be more fully described hereinafter Outside parallel blade 60 includes a pair of grooves 62a and 62b for adjustably securing the blade 60 to surface 28 of vibratory bowl 20 via threaded screws or bolts 64a and 64b. As most clearly shown in FIG. 2, polycast bowl 20 includes a pair of rigid threaded inserts 42a and 42b molded within the bowl 20 for receiving corresponding threaded screws 64a and 64b. Inserts 42a and 42b are an important aspect of the present invention in that they provide a secure threaded attachment for screws 64a and 64b, and at the same time provide a wear-resistant attachment mechanism for permitting multiple adjustments of blade 60. Preferably, inserts 42a and 42b are made of a wear-resistant metal such as, for example, steel. Parallel blade 60 can thus be adjustably positioned toward and away from parallel blade 120 by loosening screws 64a and 64b and manually adjusting the blade 60. Blade 60 can thereafter be secured to orientation member surface 28 by tightening screws 64a and 64b into threaded inserts 42a and 42b.

Figure 3:
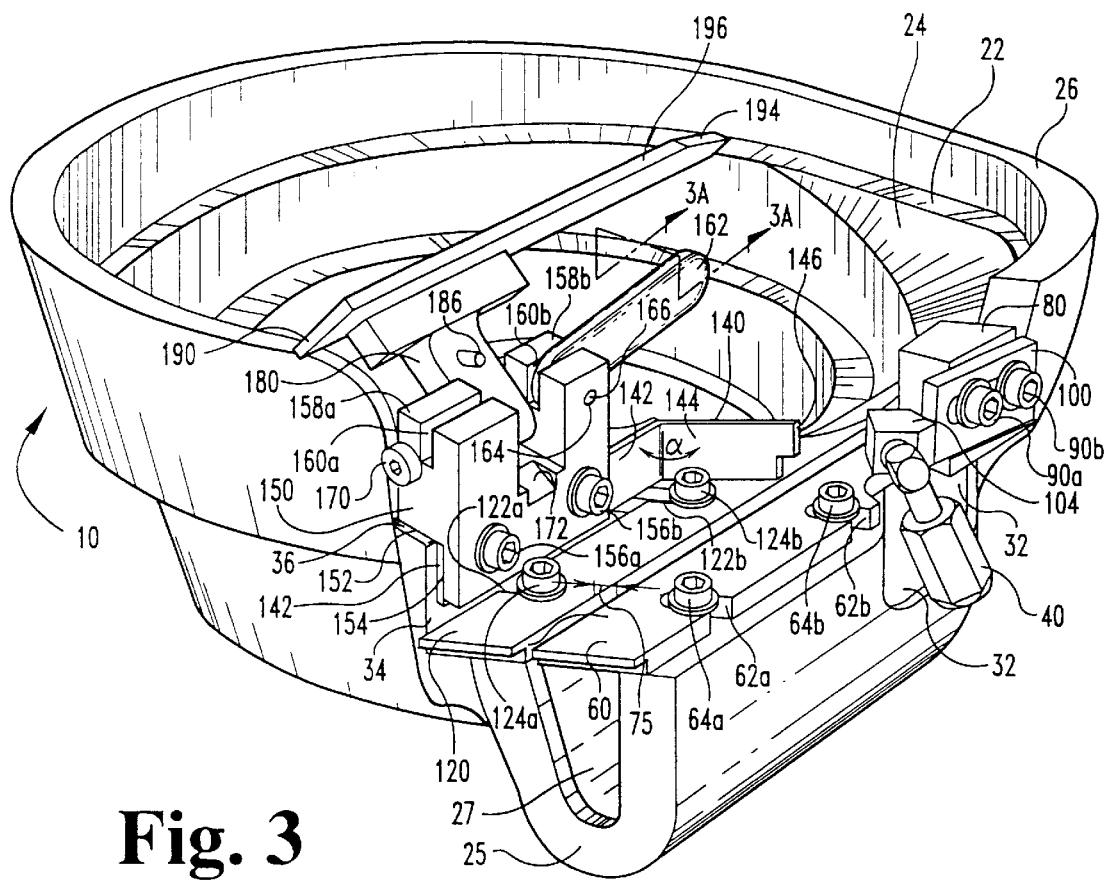
FIG. 3 is a right front perspective view of the embodiment shown in FIG. 1 showing the top confinement member pivoted away from its parts confining position.
Figure 5:
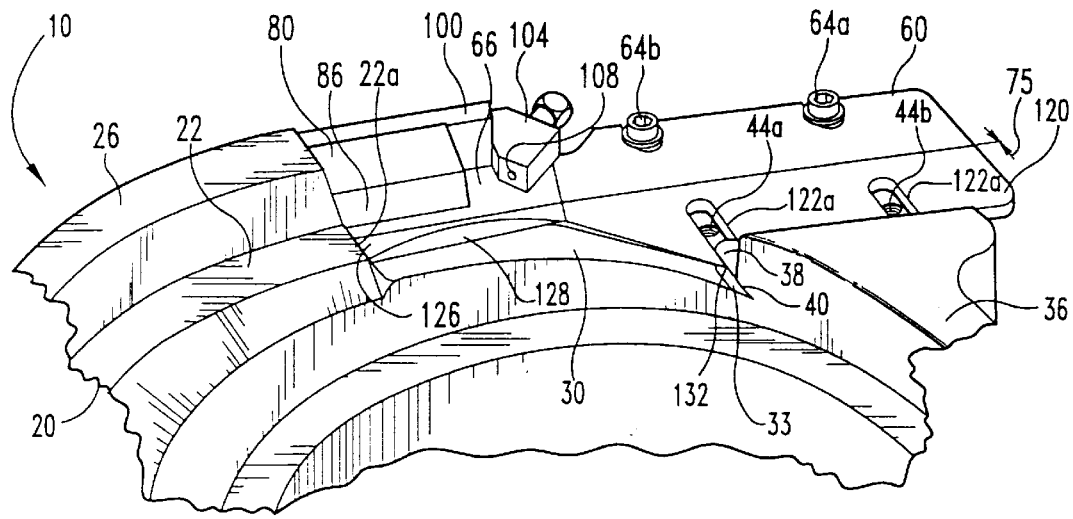
FIG. 5 is a left perspective view of the embodiment shown in FIG. 1, with the pivotal top confinement structure omitted therefrom for clarity, showing the parts receiving unit adjusted for minimal channel width.

As most clearly shown in FIG. 3, parallel blade 120 includes corresponding channels 122a and 122b for receiving screws 124a and 124b. As shown in FIGS. 5 and 6, orientation member surface 30 includes rigid inserts 44a and 44b, identical to inserts 42a and 42b, molded therein for receiving screws 124a and 124b.

Parallel blade 120 may therefore be adjustably positioned relative to blade 60 in a manner identical to that described in relation to the adjustable positioning of blade 60. Opposing faces 72 of blade 60 and 134 of blade 120 thus define an adjustable-width channel 75 therebetween. The channel width 75 may be adjusted in the manner just described such that the heads of the headed parts to be oriented are supported by the parallel blades 60 and 120 while the shafts of the headed parts extend into a hollow recess 27 of the parts orientation member 25, as shown with respect to oriented screws 12 and 13 of FIG. 2.

Referring now to FIGS. 5 and 6, the parallel blades 60 and 120 are shown in their extreme positions. In FIG. 5, blades 60 and 120 are adjusted toward each other so that channel 75 has minimal width. With blades 60 and 120 in this position, vibratory parts feeder 10 could be used, for example, to provide oriented pins such as those used in garment and sewing industry. In FIG. 6, blades 60 and 120 are adjusted away from each other so that channel 75 has maximum width.

As seen in FIGS. 5 and 6, blade 120 and bowl 20 are configured to provide an important aspect of the present invention. Bowl 20 defines a projection 38 which extends from bowl surfaces 30 and 34 and is configured to be received within channel 122a. Bowl 20 further defines a recess 40 between the projection 38 and the bowl surface 30 for receiving a projection 132 of parallel blade 120. In operation, projection 132 cooperates with projection 38 and recess 40 to provide a continuous surface 33 for directing misoriented parts back into the interior of the bowl 20 regardless of the position of the blade 120. When the channel 75 is adjusted to maximum width, as shown in FIG. 6, projection 132 is received within recess 40 and projection 38 is fully received within channel 122a. However, as channel 75 is decreased in width, pointed projection 132 moves toward channel 75 while maintaining contact with surface 33 of projection 38. Thus, regardless of the position of blade 120 relative to the bowl 20, a substantially continuous surface 33 is maintained between the projection 132 and projection 38. In the absence of such a projection 38 a recess or slot would exist, thereby providing a potential parts jamming location. The configuration of projections 38 and 132 overcome this potential problem by providing continuous bowl surface 33 regardless of the position of blade 120.

Figure 6A:
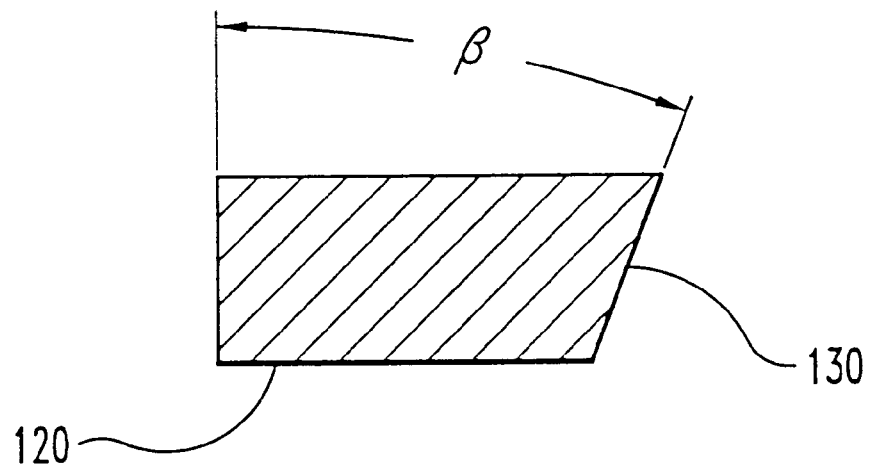
FIG. 6A is a cross-sectional view of a portion of the inside parallel blade of the embodiment shown in FIG. 1, taken along section lines 6A—6A of FIG. 6.
Figure 6:
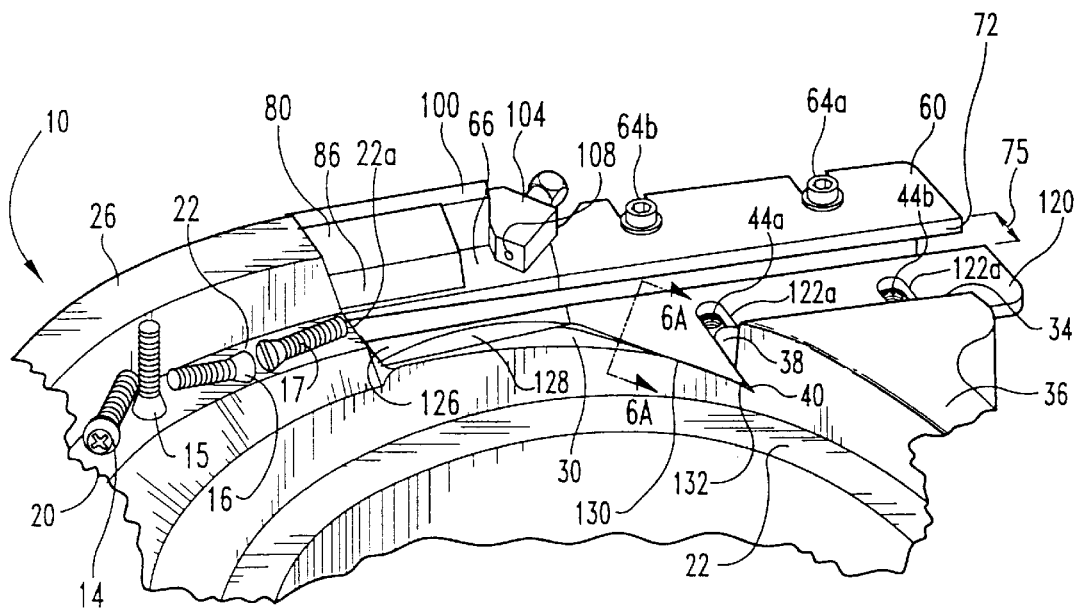
FIG. 6 is a view similar to that of FIG. 5 showing the parts receiving unit adjusted for maximum channel width.

Referring now to FIGS. 6 and 6A, the underside of blade 120, in the vicinity of projection 132, defines a sloped surface 130. Surface 130 extends from the top surface of blade 120 toward surface 30 of bowl 20 at an angle β. Preferably, β is approximately 21 degrees, although the present invention contemplates β angles of between approximately 5 degrees and 75 degrees. In operation, surface 130 may extend beyond surface 30 toward the interior of bowl 20 when, for instance, blade 120 is adjusted, to provide a maximum channel width 75. In such case, surface 130 could, if not properly configured, provide a potential parts jamming location between, for example, surface 130 and the parts track 22 located just beneath surface 130. However, by providing surface 130 at an angle β as shown in FIG. 6A, the potential for parts jams is greatly reduced. As parts progress along track 22, the angled surface 130 permits parts to reposition themselves on track 22 so that jams are thereby avoided.

Figure 2:
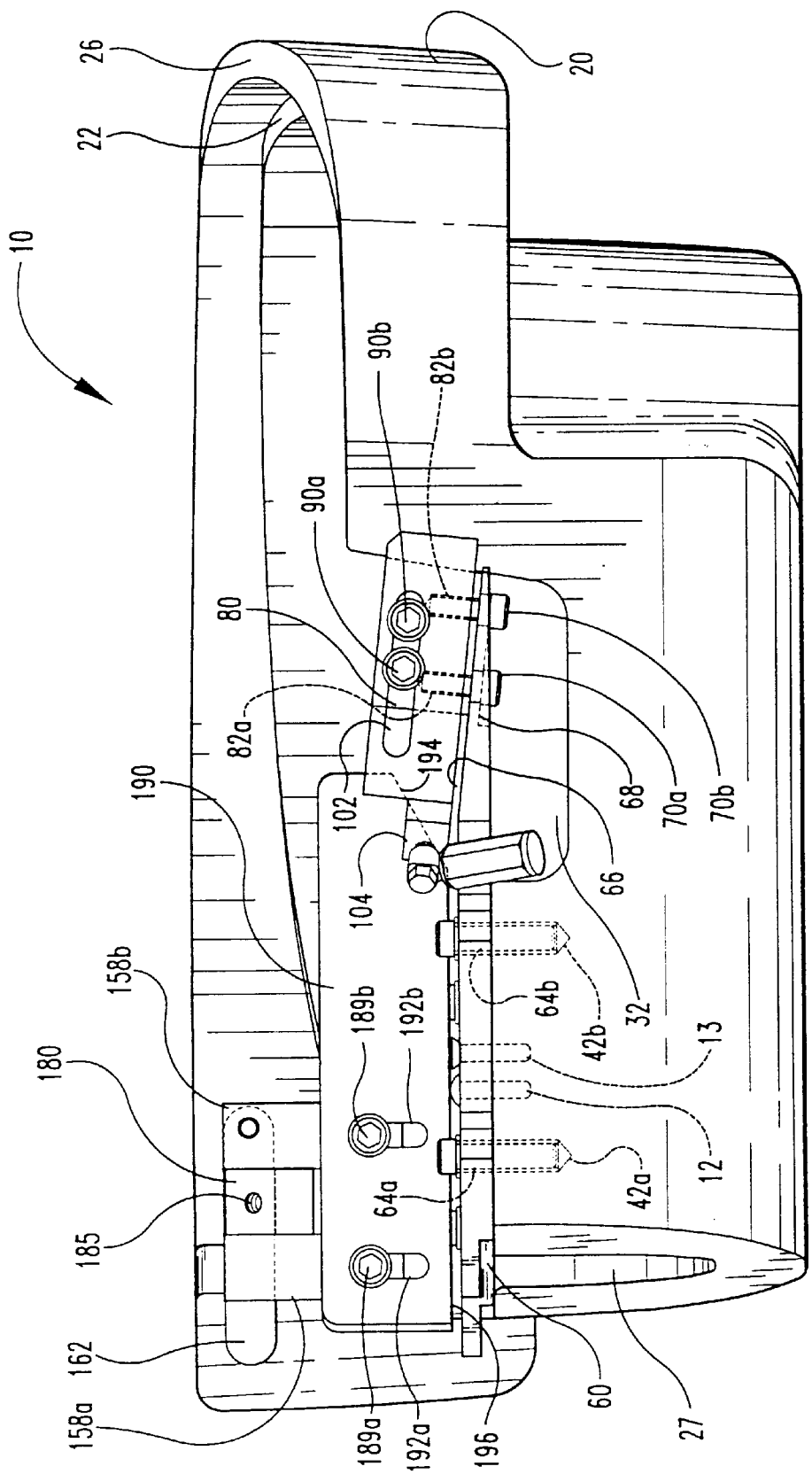
FIG. 2 is a side elevational view of the embodiment shown in FIG. 1.

Referring now to FIGS. 1–6, blade 60 includes a sloped face 66 between screw 64b and the parts discharge port 22a, as most clearly shown in FIG. 2. Parallel blade 120 includes an identically sloped face 126 located adjacent sloped face 66. Sloped faces 66 and 126 provide a slight ramp to facilitate proper orientation of the headed parts. Although a ramp provided by sloped faces 66 and 126 may be unnecessary in certain applications, it has been found that such a ramp slows headed parts having long shafts sufficiently to permit the shafts to drop into the open channel 75 before reaching the top confinement blade 190. Preferably, faces 66 and 126 are sloped at approximately 10 degrees, although the present invention contemplates both greater and lesser slopes depending upon the shaft lengths of the parts being oriented, and on the corresponding desired degree of slowing of the parts.

The parts orientation unit 50 further includes a guide block 80 attached to blade 60 via screws 70a and 70b. As most clearly shown in FIG. 2, blade 60 includes on its underside a recessed portion 68 which is sloped identically with surface 66. Such a sloped recess 68 permits the guide block 80 to be mounted flush with the sloped surface 66 via screws 70a and 70b into correspondingly threaded holes 82a and 82b of the guide block 80. As most clearly shown in FIG. 6, guide block 80 has a face 86 which is more or less vertically flush with surface 72 of parallel blade 60. Guide face 86 helps to maintain axial alignment of the headed parts with the longitudinal axis of the open channel 75. This feature will be illustrated for two separate cases. In the first case., a headed part, such as part 17 of FIG. 6, is advancing, shaft first, toward the discharge port 22a. As the shaft continues to advance over open channel 75, guide face 86 maintains axial alignment of the shaft with the longitudinal axis of the channel 75 until a sufficient portion of the shaft has advanced over the channel 75 so that the weight of the shaft causes the shaft to drop into the channel 75, and the headed part assumes the position of screw 12 shown in FIG. 2. In a second case, a headed part, such as part 16 of FIG. 6, is advancing, head first, toward discharge port 22a. In order for the shaft to drop into channel 75, as previously described, the part must advance over the channel 75 until the end of the shaft is free to drop within the slot 75. Guide face 86 maintains axial alignment of the headed part with the longitudinal axis of channel 75 until the end of the shaft can drop into the channel 75. In either case, guide face 86 keeps the headed part from moving transverse to the longitudinal axis of channel 75 until a properly oriented part can assume the position of, for example, screw 12 of FIG. 2. Misoriented parts traveling towards discharge port 22a are returned to the interior of the vibratory bowl 20 in one of at least four ways to be fully described hereinafter.

Guide block 80 further includes a pair of threaded holes 88a and 88b for receiving screws 90a and 90b, respectively, for attaching air block 100 thereto. Air block 100 includes an open channel 102 for receiving screws 90a and 90b. Air block 100 may therefore be adjustably positioned along an axis parallel with the longitudinal axis of channel 75, by sliding screws 90a and 90b within channel 102. Air block 100 may thereafter be rigidly secured to guide block 80 by tightening screws 90a and 90b. Air block 100 further includes a nozzle portion 104 having a bore 106 defined partially therein for receiving an air source fitting 110. An air outlet passage 108 is connected to bore 106 and provides air supplied to air source nozzle 110 across channel 75. Another important aspect of the present invention is the positioning of the air nozzle 104 such that air is blown from air outlet 108 at an acute angle relative to an axis parallel to the longitudinal axis of channel 75. Thus, air nozzle 104 provides a stream of air not directly transverse to channel 75, but in a direction slightly opposing the flow of headed parts through the parts orientation unit 50. Such a stream of air is one method of returning misoriented parts, such as headed part 15 standing on its head, into the vibratory bowl 20. It has been found that providing a transverse, and slightly upstream, flow of air relative to the flow of parts is more effective for rejecting misoriented parts back into the vibratory bowl 20 than by merely providing an air stream transverse to the flow of parts. Preferably, the acute angle is set at approximately 45 degrees, although the present invention contemplates acute angles of between approximately 10 degrees and just under 90 degrees. The height of air nozzle 104, and proximity of air nozzle 104 with respect to the guide block 80, is adjustable via screws 90a and 90b.

A second mechanism for returning misoriented parts, traveling toward discharge port 22a, is provided by appropriately configuring a portion of the sloped face 126 of the parallel blade 120. As most clearly seen in FIGS. 1 and 6, sloped face 126 includes a second sloped face 128 which slopes downwardly toward the interior of the vibratory bowl 20. Headed parts, such as part 14, which are unable to maintain axial orientation with the longitudinal axis of channel 75 may, either on their own or under the influence of the air stream exiting outlet 108, slide down the sloped face 128 and back into the vibratory bowl 20.

Referring now to FIGS. 1–4, the parts confinement unit 55 will now be described in detail. Confinement unit 55 includes a pivot support block 150 which has a bottom surface 152 adapted to rest on surface 36 of the vibratory bowl 20. Pivot support block 150 further includes a vertical surface 154 for engagement with a portion 142 of deflector 140. Portion 142 of deflector 140 is further in contact with vertical wall 34 of the vibratory bowl 20. Pivot support block 150 and deflector 140 have a pair of bores disposed therethrough (not shown) for receiving screws 156a and 156b. Although not shown in the figures, it is to be understood that vertical wall 34 of the vibratory bowl 20 includes threaded inserts, identical to inserts 42a and 42b, molded within the bowl 20 for receiving the screws 156a and 156b. Pivot support block 150 is thus mounted to the vibratory bowl 20 via screws 156a and 156b, received through correspondingly aligned bores in the pivot support block 150 and deflector 140, and secured to threaded inserts molded within the vertical wall 34 of the bowl 20.

Deflector 140 further includes an angle portion 144 which extends from portion 142 at an angle and terminates at the channel 75. In accordance with another important aspect of the present invention, deflector 140 serves two purposes. First, the screws 156a and 156b, more so than screws 64a, 64b, 124a, and 124b, are under considerable force to draw the screws away from the vertical surface 34 of the bowl 20, during operation of the parts confinement unit 55, as will be more fully discussed hereinafter. To prevent screws 156a and 156b from extracting the threaded inserts molded into the vertical face 34 of the bowl 20 under such force, the deflector portion 142, positioned between the pivot support block 150 and the vertical bowl face 34, acts as a washer to retain the threaded inserts within the vertical wall 34. Secondly, deflector 140 includes an angled portion 144 extending from deflector portion 142 at an angle , and terminating at the channel 75. Angled portion 144 includes a surface 141 which provides a third mechanism for directing misoriented screws, advancing toward the discharge port 22a, back into the interior of the bowl 20. As most clearly shown in FIGS. 1 and 6, a misoriented screw, such as screw 14, may be partially received within the channel 75, although incorrectly oriented, and may not be directed back into the interior of the bowl 20 by the air stream exiting outlet 108 or by the sloped surface 128 of parallel blade 120. Such a screw will be directed back into the interior of the bowl upon contact with the surface 141 of deflector 140. Preferably, α is set at approximately 140 degrees, although the present invention contemplates α angles of between just over 90 degrees and approximately 170 degrees.

Figure 3A:
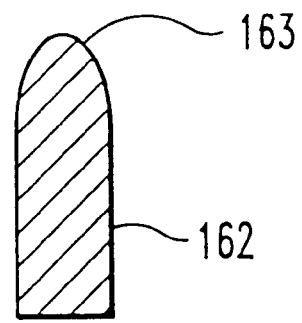
FIG. 3A is a cross-sectional view of the pivoting lever taken along section lines 3A—3A of FIG. 3.

Pivot support block 150 further includes a pair of projections 158a and 158b extending therefrom. Projection 158a includes a groove 160a therein having a longitudinal axis parallel to the longitudinal axis of channel 75. Projection 158b includes a similar groove 160b which is axially aligned with groove 160a. One end of a locking lever 162 is received within the channel 160b and is pivotably attached to pivot support block 150 thereat. The pivot support block 150 includes a bore 164 defined through projection 158b, which bisects channel 160b. Locking lever 162 includes a similar bore at one end thereof which, when received within channel 160b, is axially aligned with bore 164. A pin 166 extends through the bore 164 and the bore defined within the locking lever 162 to thereby pivotably attach the locking lever 162 within the channel 160b. As most clearly seen in cross-section in FIG. 3A, locking lever 162 has a rounded edge 163 which facilitates the entry of the locking lever 162 within grooves 160a, 160b, and groove 184 of pivot block 180 (FIG. 4).

Parts confining unit 55 further includes a pivot block 180 which is pivotably attached to pivot support block 150 via pin 170. As most clearly shown in FIG. 1, projection 158a of the pivot support block 150 defines a bore 168a therethrough which has a longitudinal axis parallel to the longitudinal axis of channel 160a. Similarly, projection 158b includes a bore 168b disposed therethrough which has a longitudinal axis parallel to the parallel axis of channel 160b. Pivot block 180 includes a bore 182, identical to bores 168a and 168b, through one end thereof. Bore 182 becomes axially aligned with bores 168a and 168b when pivot block 180 is positioned between projections 158a and 158b of pivot support block 150 as shown in FIGS. 1, 3 and 4. Pin 170 extends through bores 168a, 168b and 182 to thereby pivotably attach pivot block 180 to pivot support block 150.

At an end opposite to the pivotable attachment to pivot support block 150, pivot block 180 defines a pair of projections 185a and 185b extending laterally therefrom in opposite directions. Projection 185a defines a bore 188a therethrough for threadingly receiving a screw 189a. Similarly, projection 185b defines a bore 188b therethrough for threadingly receiving a screw 189b. Parts confining unit 55 further includes a parts confining member 190, or top confinement blade, which is attached to pivot block 180 via screws 189a and 189b. As most clearly shown in FIGS. 2 and 4, top confinement blade 190 includes a pair of slots 192a and 192b for receiving screws 189a and 189b, respectively. The position of top confinement blade 190 relative to the pivot block 180, corresponding to the height of the top confinement blade 190 above the channel 75 as show in FIGS. 2 and 4, is therefore adjustable through appropriate positioning of screws 189a and 189b within slots 192a and 192b, respectively. Finally, top confinement blade 190 includes an angled edge 194 which, when disposed in the position shown in FIGS. 2 and 4, is adjacent to the parts discharge port 22a. The purpose of angled portion 194 is two-fold. First, a screw, such as screw 15 of FIG. 6, may be received within the channel 75 head-first. If the air stream exiting outlet 108 does not direct the screw 15 back into the interior of the bowl 20, the sloped edge 194 of top confinement blade 190 is intended to topple the screw forward so that its shaft may be received within the channel 75. Secondly, a screw, such as screw 14 of FIG. 6, may not be directed back into the interior of the bowl 20 by either the air stream exiting outlet 108 or the sloped face 128 of the parallel blade 120. The sloped edge 194 of the top confinement blade 190 is further intended to provide a fourth mechanism for returning misoriented screws back into the interior of the bowl 20 by allowing such screws, such as screw 14, to continue traveling along the channel 75 until the deflecting surface 141 of the deflector 140 can direct the screw back into the interior of the bowl 20.

Figure 4:
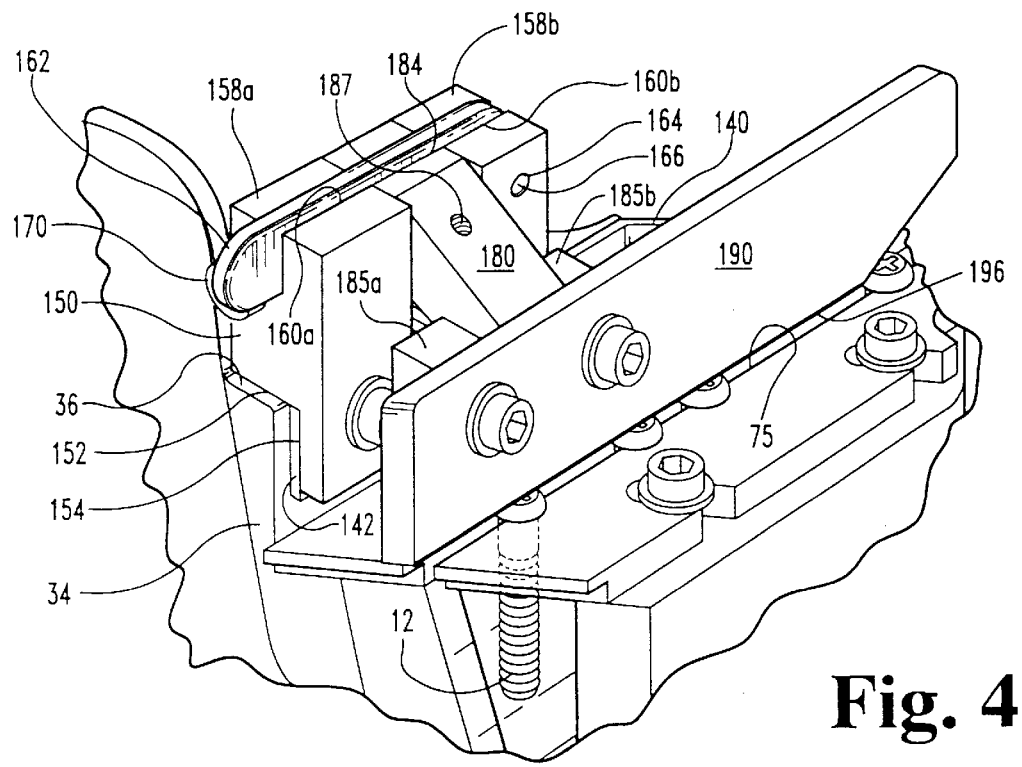
FIG. 4 is a right front perspective view of the embodiment shown in FIG. 1 showing details of the top confinement member in its parts confining position.

With the parts confining unit 55 just described, the top confinement blade 190 may be pivoted between a first position, shown in FIG. 3, and a second position, shown in FIG. 4, wherein the bottom edge 196 of the top confinement blade 190 provides a top confinement mechanism to keep the oriented parts from vibrating out of the channel 75. In its first position, the top confinement blade 190 is pivoted beyond 90 degrees from its second position so that the combination of the pivot block 180 and top confinement blade 190 may maintain the first position under the force of gravity. In such a position, the parts feeding apparatus 10 may be initially set up by adjusting the various components of the parts orientation unit 50 such as the parallel blades 60 and 120, the guide block 80, the air block 100, and the deflector 140, and for clearing any parts jams that may occur during operation of the apparatus 10. In its second position, shown in FIG. 4, the edge 196 of the top confinement blade 190 is rigidly secured at a desired distance above the channel 75, in order to provide top confinement for the oriented parts 12 traveling through channel 75.

In order to rigidly secure the top confinement blade 190 and the pivot block 180 in their second position as shown in FIG. 4, pivot block 180 further includes a projection 186 disposed within bore 187 of pivot block 180 and extending from its underside as shown in FIG. 3. Pivot support block 150 includes an inclined surface 172 which contacts the projection as the top confinement blade 190 is pivoted to its second position. Preferably, projection 186 is configured such that the top confinement blade 190 is positioned just above its second position when the projection 186 is in contact with surface 172 and the locking lever 162 is in its unlocked position as shown in FIG. 3. As most clearly shown in FIG. 4, pivot block 180 further includes a channel 184 which is identical in dimension to channels 160a and 160b. When projection 186 is in contact with surface 172 under the action of gravity, the top confinement blade 190 is positioned just above its second position of FIG. 4. In this position, channel 184 is not quite axially aligned with channels 160a and 160b. As locking lever 162 is pivoted toward channel 160a, the rounded edge 163 contacts one edge of the channel 184, forcing the channel 184 into axial alignment with channels 160a and 160b. Further pivoting of locking level 162 permits the lever 162 to be received within channel 160a as shown in FIGS. 1, 2 and 4. When locking lever 162 is completely received within channel 160a, locking lever 162 is in its locked position. This sequence of pivoting the top confinement blade 190 and pivot block 150 to just above the second position such that the projection 186 contacts the surface 172 under the action of gravity and thereafter pivoting the locking lever 162 from its unlocked position to its locked position, as shown in FIGS. 1, 2 and 4, simulatenously forces the top confinement blade 190 and pivot block 180 into the second position and rigidly forces extension 186 against surface 172 so that the entire parts confining unit 55 is locked in a secure position. This ensures that none of the top confinement components will rattle under vibratory operation. Such a locking force can be put substantial pressure on screws 156a and 156b, tending to force them outwardly toward the channel 75. Without some mechanism to maintain the threaded inserts within the vertical wall 34 of the polycast bowl 20, such a substantial force could result in the extraction of the threaded inserts from the bowl wall 34. The importance of the deflector portion 142 is thus immediately recognized in that it provides a counter force, under the pressure of screws 156a and 156b, to retain the threaded inserts within the bowl wall 34. Although similar threaded inserts are incorporated within other areas of the polycast bowl 20, none are generally subject to such forces that require the inclusion of counter force plates or washers.

In operation, the top confinement bar 190 is pivoted to its first position, as shown in FIG. 3, and the various components of the parts orientation unit 50 are adjusted, as previously described, to suit the dimensions of the particular parts being oriented. Such adjustments include, for example, positioning the top confinement bar 190 relative to the pivot block 180, adjusting the parallel blades 60 and 120 to thereby set the channel width 75, and adjusting the position of the air block 100. Once the set up procedure is completed, the top confinement bar 190 is pivoted to just above its second position, so that projection 186 contacts surface 172. Top confinement blade 190 is thereafter forced into its second position, as shown in FIGS. 1, 2 and 4, by pivoting the locking lever 162 from its unlocked position, shown in FIG. 3, to its locked position, shown in FIGS. 1, 2 and 4. With all of the components of the parts orientation unit 50 adjusted and solidly secured, the vibratory bowl 20 and parts orientation unit 50 may be vibrated, under the action of a vibratory drive unit, (not shown), so that a disoriented mass of parts 11 contained within the bowl 20 are transported, in a circumferential manner, along the parts track 22 toward the discharge port 22a. Parts having certain orientations, as previously discussed, will be oriented within the channel 75, and serially provided from the channel 75 in this oriented fashion. Parts traveling towards discharge port 22a that have orientations other than the number of orientations permitted in order for the parts to be received within the channel 75 are directed back into the interior of the bowl 22 by any of a combination of the downwardly sloped surface 128 of the parallel blade 120, the air jet stream exiting orifice 108 of the air block 100, the deflector surface 141 of deflector 140, and the angled edge 194 of the top confinement blade 190.

Figure 7:
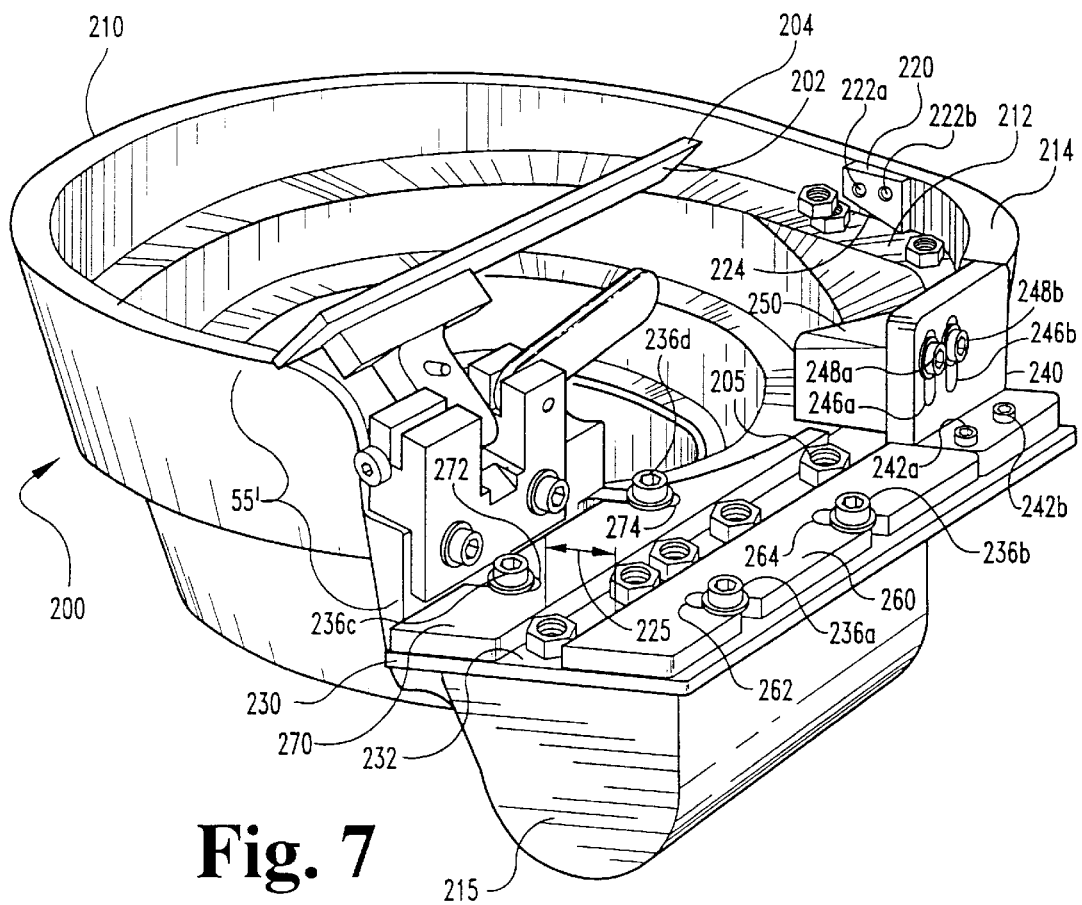
FIG. 7 is a right front perspective view of a vibratory parts feeder with pivotal top confinement in accordance with an alternate embodiment of the present invention.
Figure 8:
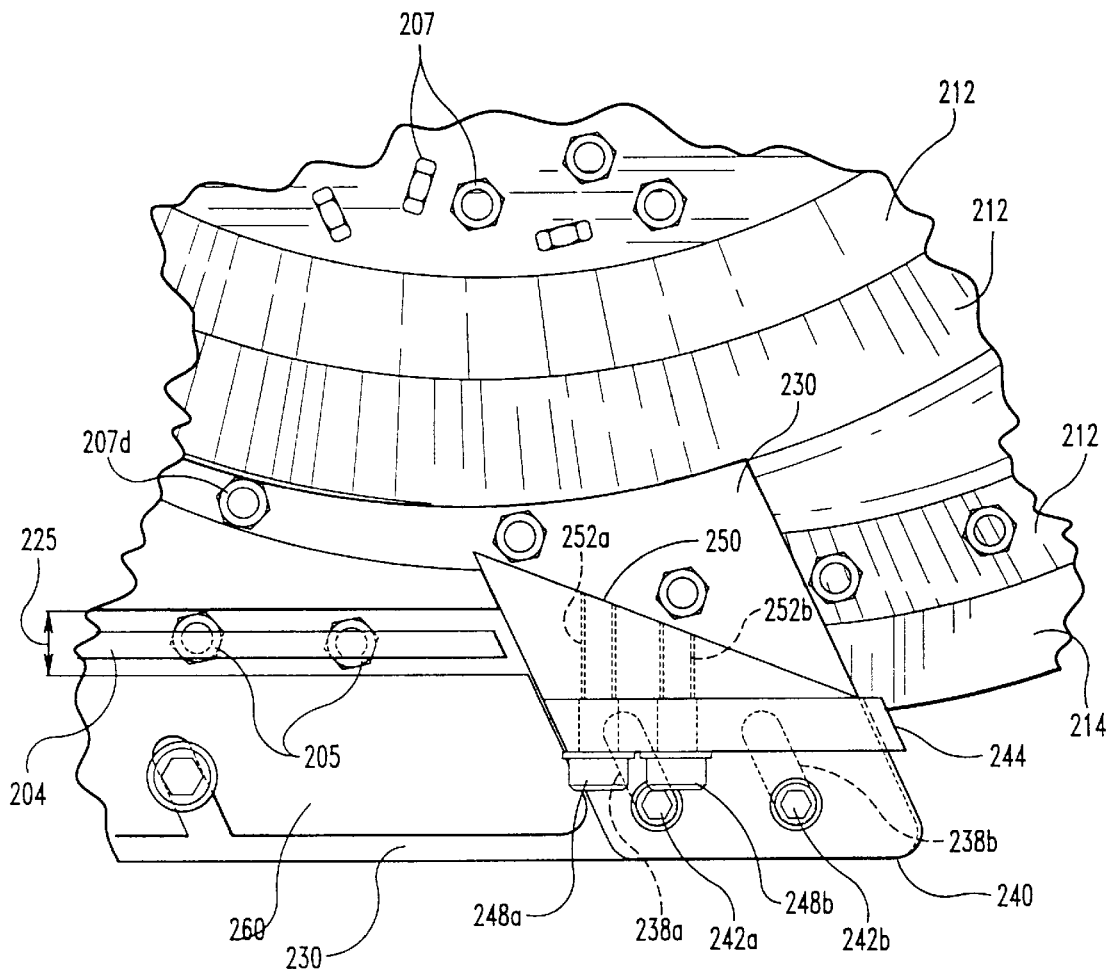
FIG. 8 is a top plan view of the parts receiving portion of the embodiment shown in FIG. 7.

Referring now to FIGS. 7 and 8, an alternative parts feeding apparatus embodiment 200 is shown. Generally, parts feeding apparatus 200 is useful for orienting non-elongated parts such as threaded nuts, washers, coins, and the like, as well as certain compact assemblies and sub-assemblies. The parts feeding apparatus 200 utilizes a parts confining unit 55' which is identical in most respects to the parts confining unit 55 described with respect to FIGS. 1–6, and will therefore not be discussed further. The sole difference between parts confining unit 55' and the parts confining unit 55 is the configuration of top confinement blade 202. As shown in FIG. 7, top confinement blade 202 lacks the angled edge 194 of top confinement blade 190 and instead includes a right-angled edge 204 in place thereof.

Parts feeding apparatus 200 includes a vibratory bowl 210 which is similar in many respects to the vibratory bowl 20 as described with respect to FIGS. 1–6. For example, vibratory bowl 210 includes a parts transportation track 212 defined therein which terminates at a discharge portion 212a. Similarly, bowl 210 includes an upper rim 214 for preventing the parts from escaping therefrom under vibratory action. However, since the parts feeding apparatus 200 is not intended for use with elongated parts, the parts orientation unit support 215 need not be bifurcated as with the previous embodiment, but may be a solid construction as shown in FIG. 7.

Attached to parts orientation support 215 is a base plate 230. Base plate 230 is intended to provide a surface 232 for directing parts into the channel 225, and for providing a support surface under channel 225.

An outside parallel blade 260, similar to parallel blade 60 of the previous embodiment, includes grooves 262 and 264 for receiving screws 236a and 236b. As with the previous embodiment, the parts orientation unit support 215 includes threaded inserts molded therein for threadingly receiving screws, such as screw 236a. Outside parallel blade 260 is positioned on top of the base plate 230, and may be laterally adjusted relative to screws 236a and 236b to provide a desired channel width 225. An inside parallel blade 270 is also included and has grooves 272 and 274 for receiving screws 236c and 236d, respectively. As with outside parallel blade 260, inside parallel blade 270 may be laterally adjusted to provide a desired channel width 225 therebetween. As with the previous embodiment, vibratory bowl 210 includes a projection 216, and inside parallel blade 270 includes a projection 276 which are correspondingly configured to provide a non-jamming surface regardless of the lateral position of the inside parallel blade 270.

Parts feeding apparatus 200 further includes an entrance mount 240 having an entrance block 250 attached thereto. As most clearly shown in FIG. 8, base plate 230 includes a pair of slots 238a and 238b therethrough, a pair of bores are correspondingly defined within the entrance mount 240 which are axially aligned with slots 238a and 238b. Screws 242a and 242b are provided therethrough for attaching the entrance mount 240 to the base plate 230. Due to the slots 238a and 238b, the entrance mount 240 may be adjusted perpendicularly toward and away from the longitudinal axis of channel 225. Entrance mount 240 may therefore be adjusted so that surface 241 is flush with edge 268 of outside parallel blade 260.

Entrance mount 240 further includes a vertical portion 244 having slots 246a and 246b disposed therethrough. Entrance block 250 includes corresponding threaded bores 252a and 252b for receiving screws 248a and 248b as shown in FIGS. 7 and 8. The height of entrance block 250 above the channel 225 may thereby be adjusted to accommodate parts having different heights.

Finally, parts feeding apparatus 200 includes a sweep 220 attached to the vibratory bowl 210 above the parts track 212 and remote from the discharge port 212a. Sweep 220 defines a pair of bores therethrough for receiving screws 222a and 222b. As with all other screw-type attachments to bowl 210, a pair of threaded inserts, identical to those described with respect to the previous embodiment, are cast within the bowl 210 for receiving screws 222a and 222b. Sweep 220 includes a sloped surface 224 which slopes generally downwardly in the direction of parts movement along parts track 212. In feeding parts having flat surfaces, such as washers and threaded nuts, it is possible that parts may be fed along parts track 212 in a stacked or piggy-back fashion as shown in FIG. 7. The purpose of sweep 220 is to separate such a stack and provide separate or discrete parts to discharge port 212a. Sweep 220 is thus positioned so that its lowest portion of surface 224 permits passage of a single, and properly oriented, part therethrough. The surface 224 is sloped to a sufficient degree to permit a stack of parts to be separated while maintaining the separated parts on the parts track 212. Preferably, surface 224 is sloped at an angle of approximately 20 degrees, although the present invention contemplates slopes of between 5 degrees and 70 degrees.

In operation, a disoriented mass of parts, such as washers, threaded nuts, and the like, are provided within the vibratory bowl 210 as partially shown in FIG. 8. Under vibratory action, provided by a vibratory drive unit (not shown), the parts 207 travel, in a circumferential manner, along the parts track 212 toward the discharge port 212a. If parts become stacked or piggy-backed along the way, sweep 220 separates the stacks into individual or discrete parts for further transportation toward discharge port 212a. Upon reaching discharge port 212a, properly oriented parts, such as part 207a, will pass under the entrance block 250 and be received and oriented within the channel 225, such as part 205 shown in FIGS. 7 and 8. Parts having orientations other than those permitted to be received within the channel 225 are directed back into the vibratory bowl 210. One mechanism for directing parts back into the bowl 210 is the angled surface 254 of entrance block 250. If a part has been turned on its edge, such as part 207b, the part will not be permitted to pass under the entrance block 250, and the angled surface 254 of the entrance block 250 will direct the part back into the vibratory bowl 210. A second mechanism for directing parts back into the vibratory bowl 210 is the edge 278 of inside parallel blade 270. If a part, such as part 207c, is not close enough to the surface 241 of the entrance mount 240, the angled edge 278 of the inside parallel blade 270 will direct the part back into the vibratory bowl 210. If part 207c is located too close to the interior of bowl 210, and does not contact surface 278 of blade 270, it may continue along the top surface of base plate 203 as shown by part 207d in FIG. 8. In such a case, surface 217 of projection 216 will direct the part 207d back into the vibratory bowl 210.

Figure 10:
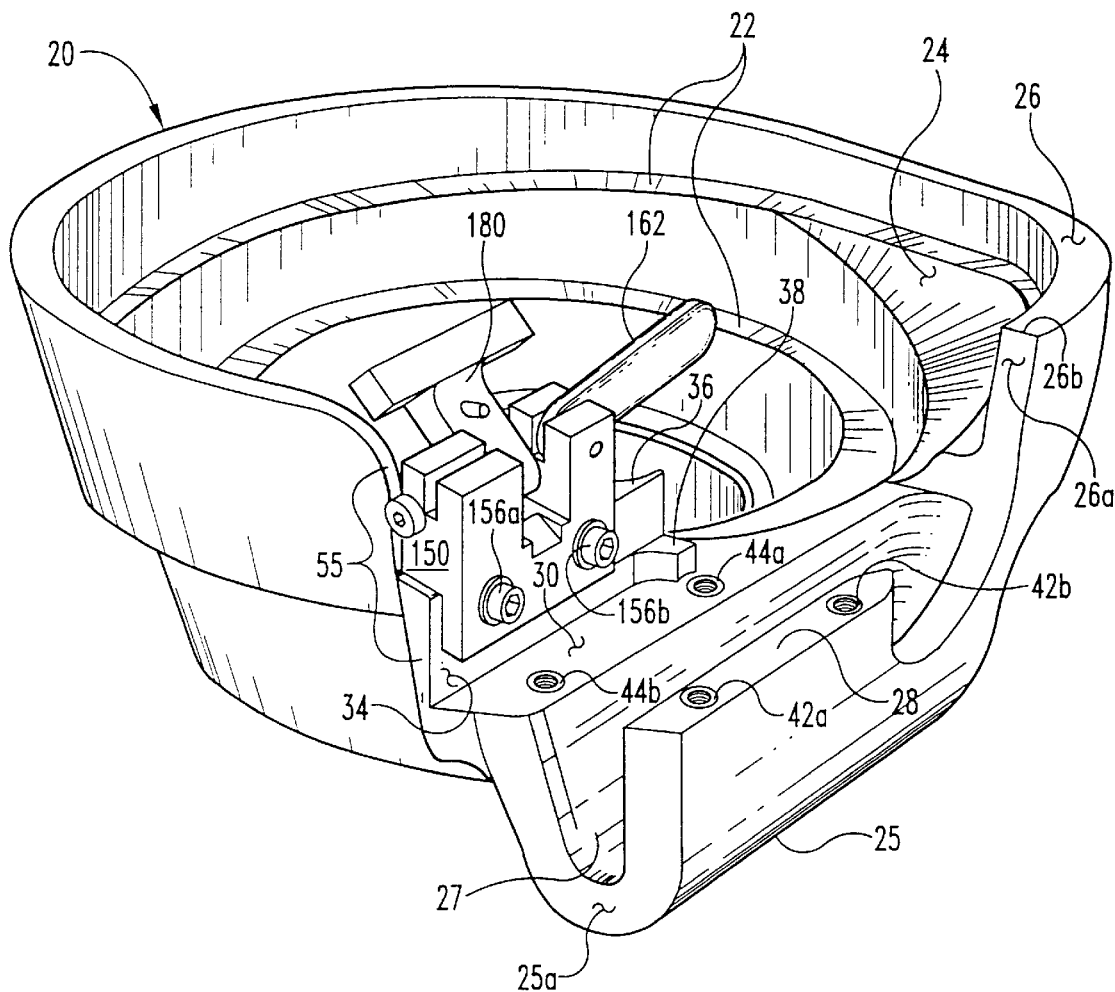
FIG. 10 is a right front perspective view of the vibratory bowl of FIGS. 1–3 showing only the pivotal top confinement apparatus of the present attached thereto.

Referring now to FIG. 10, vibratory bowl 20 is shown having only parts confinement apparatus, or pivotal top confinement apparatus, 55 attached thereto via fasteners 156a and 156b as discussed hereinabove. As used hereinafter, the term "pivotal top confinement apparatus 55" is defined as including all parts of apparatus 55 discussed hereinabove with respect to FIGS. 1–4, with the exception of deflector 140 and top confinement blade 190. As discussed hereinabove, bowl 20 preferably includes a helical parts path 22 terminating at a discharge port 22a. Parts orientation, or feeding, member 25 extends from discharge port 22a to parts orientation member wall 25a and defines a hollow recess 27 between parts orientation unit mounting surfaces 28 and 30. Upper rim 26 terminates at wall 26a, thus defining rim edge 26b thereat. Wall 26a extends downwardly toward parts orientation unit mounting surface 28 and defines a scrap chute 32 therebetween. Parts orientation unit mounting surfaces 28 and 30 each include a number of threaded inserts therein at predefined locations. Preferably, surface 28 includes two such inserts 42a and 42b therein and surface 30 similarly includes two such inserts 44a and 44b therein, although it is to be understood that the present invention contemplates providing any number of inserts within parts orientations mounting surface 28 and 30 at predefined locations.

In accordance with an important aspect of the present invention, a number of parts orientation units, such as parts orientation unit 50 of FIGS. 1–4, are provided for attachment to parts orientation unit mounting surfaces 28 and 30. Such parts orientation units are, in accordance with the present invention, configured with a number of bores and/or channels therethrough which align with the number of threaded inserts included in surfaces 28 and 30. In this manner, any of a number of different parts orientation units may be detachably mounted to parts orientation surfaces 28 and 30 of parts orientation member 25 so that a single vibratory bowl configuration may be used to feed and orient parts having various configurations.

Figure 11:
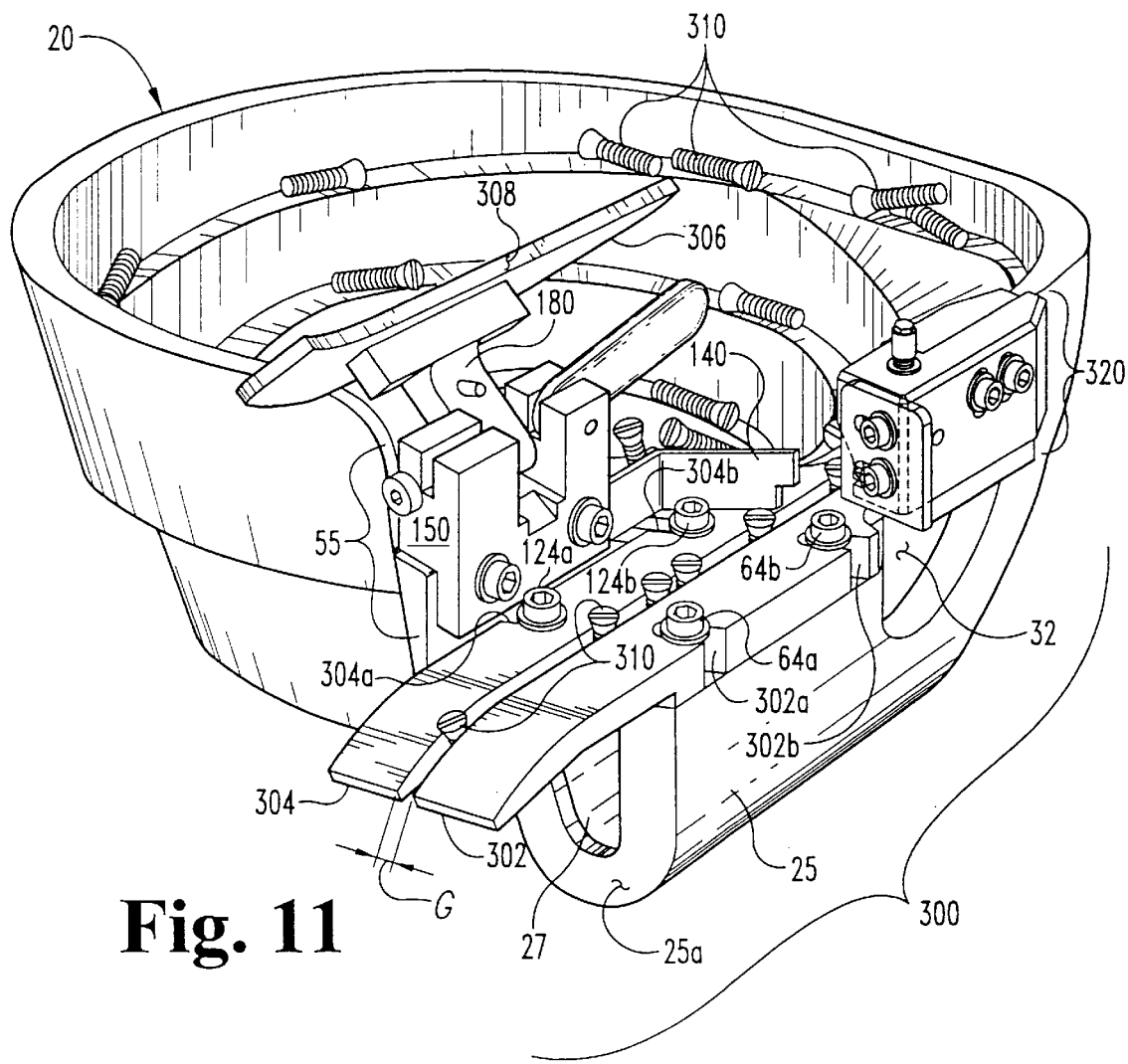
FIG. 11 is a view similar to that of FIG. 10 showing an alternate embodiment of parts orienting tooling, in accordance with the present invention.

Referring now to FIG. 11, another embodiment of a parts orientation unit 300 for use with the vibratory bowl 20 and pivotal top confinement apparatus 55, in accordance with the present invention, is shown. Parts orientation unit 300 is similar in many respects to parts orientation unit 50 of FIGS. 1–4 in that it is intended to feed and orient headed parts such as screws 310. Parts orientation unit 300 includes a pair of parallel blades 302 and 304 which are sloped downwardly at the parts exiting end thereof. Outer blade 302 includes a pair of bores 302a and 302b therethrough which, when blade 302 is mounted to surface 28, are aligned with inserts 42a and 42b respectively. Fastener 64a is received within bore 302a and insert 42a, and fastener 64b is received within bore 302b and insert 42b, to secure blade 302 to surface 28 of parts orientation number 25. Blade 304 includes a bore 304a and channel 304b which, when blade 304 is mounted to surface 30, are aligned with inserts 44b and 44a respectively. Fastener 124a is received within bore 304a and insert 44b, and fastener 124b is received within channel 304b and insert 44a, to secure blade 304 to surface 30 of parts orientation number 25. As with blades 60 and 120, FIGS. 1–4, blades 302 and 304 are adjustably positionable with respect to each other to provide a gap G therebetween of desired width. Headed parts 310 are directed to bowl discharge port 22a, under suitable vibratory action, along helical parts path 22 for eventual orientation within gap G of parts orientation unit 300 as discussed hereinabove.

Figure 12:
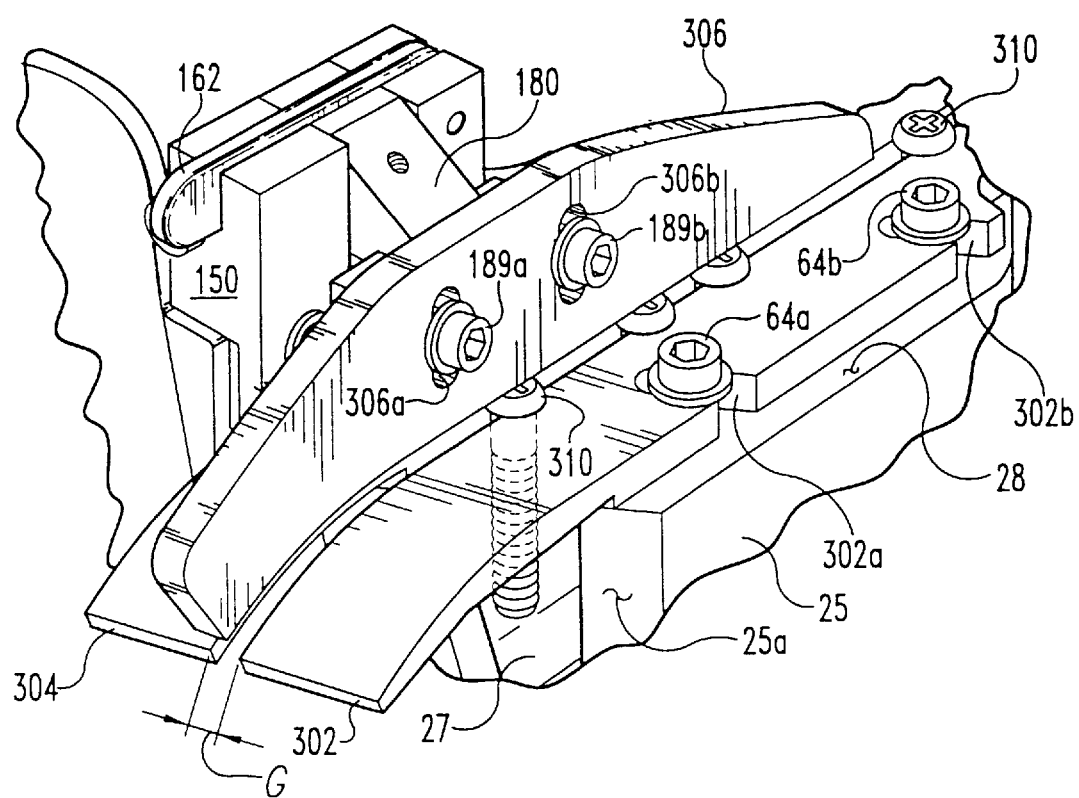
FIG. 12 is a view similar to that of FIG. 4 showing details of the top confinement member of FIG. 11 in its parts confining position.

As shown in FIGS. 11 and 12, a top confinement blade 306 includes a parts confinement surface 308 that is configured complimentarily with the shape of blades 302 and 304. Blade 306 includes a pair of grooves 306a and 306b through which fasteners 189a and 189b extend to secure blade 306 to pivot block 180 of pivotal top confinement apparatus 55. Via fasteners 189a and 189b, and slots 306a and 306b, confinement blade 306 may be adjusted, as may any of the top confinement blades discussed herein, to any desired height above the gap G defined between blades 302 and 304 to confine headed parts 310 therein. Preferably, the curved portions of blades 302, 304 and 306 slope downwardly away from mounting surfaces 28 and 30 at the wall 25a of parts orientation member 25 at an angle at approximately 35° from a horizontal plane defined by surfaces 28 and 30, although the present invention contemplates providing such curved portions having any desired angle from the plane defined by surfaces 28 and 30.

Parts orientation unit 300 further includes a parts entrance unit 320, in accordance with another aspect of the present invention, for directing properly oriented parts into the gap G between blades 302 and 304 (or the gap 75 between blades 60 and 120 of FIGS. 1–4), and for directing misoriented parts back into vibratory bowl 20. Details of the parts entrance unit 320 are shown in FIGS. 13–15b.

Figure 13:
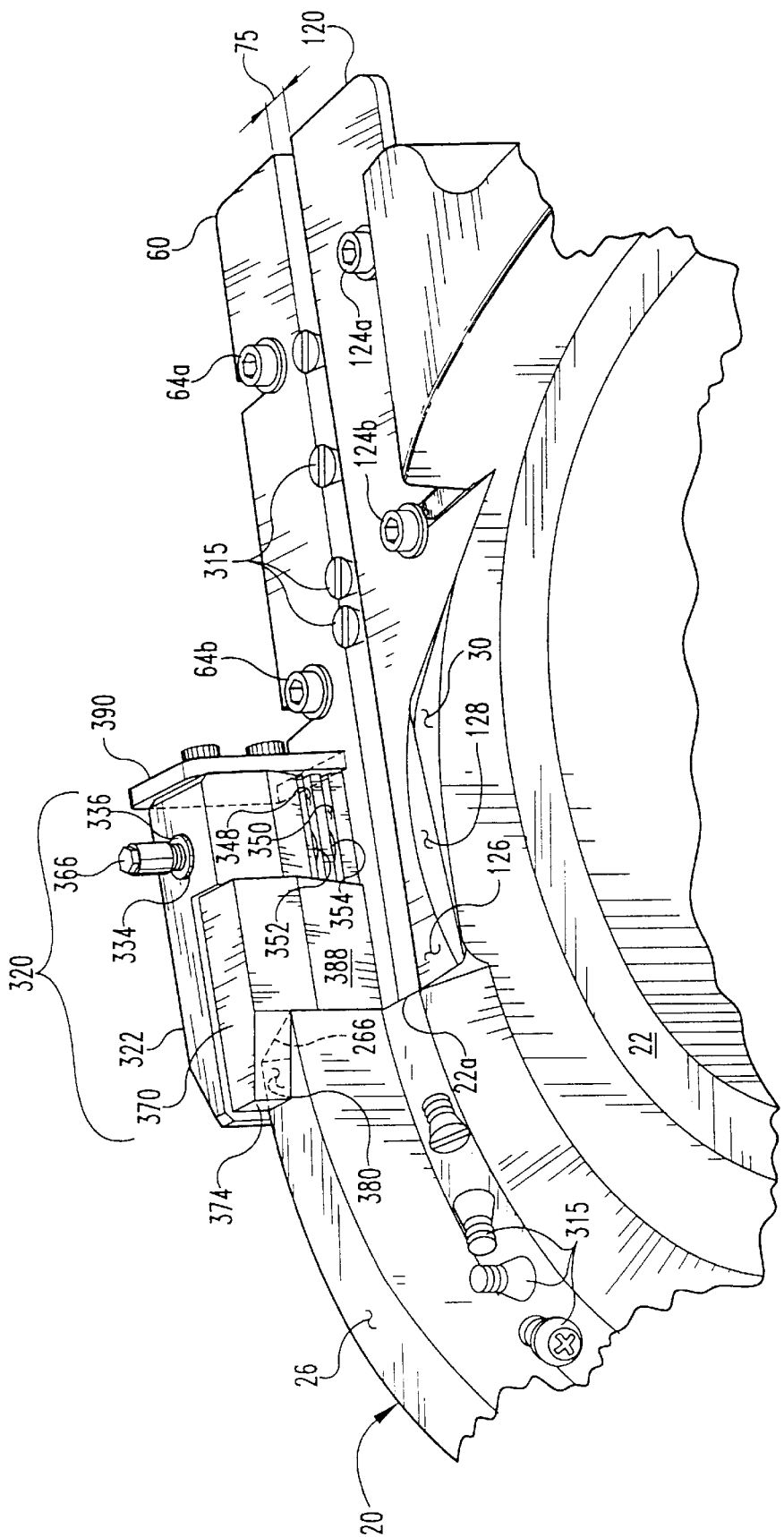
FIG. 13 is a view similar to that of FIGS. 5 and 6 showing details of an alternate embodiment of an air supply block attached to the parts orientation tooling of FIGS. 1–4 in accordance with another aspect of the present invention.
Figure 15A:
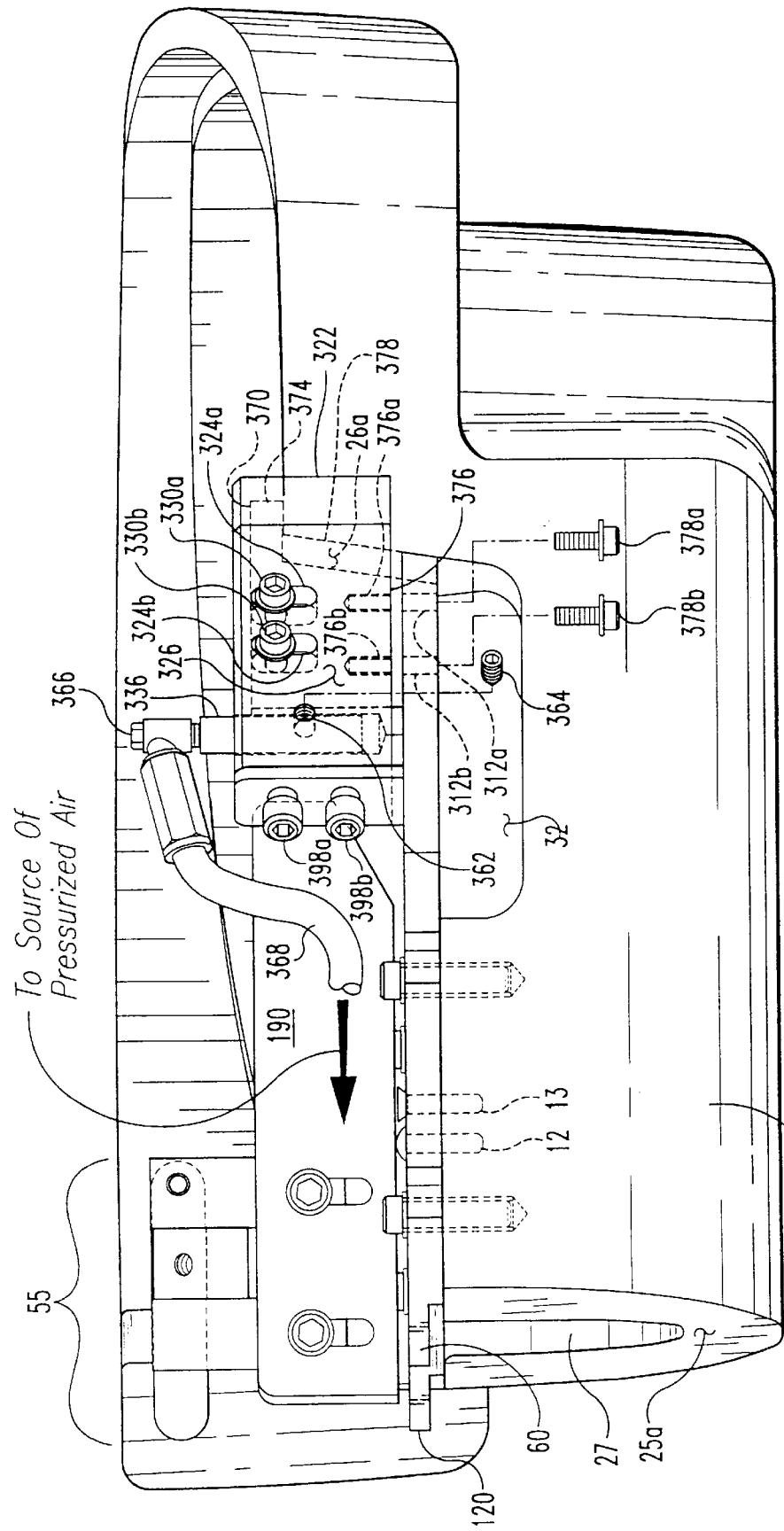
FIG. 15*a* is a view similar to that of FIG. 12 showing further details of the air supply unit of FIGS. 13–14*c*.
Figure 15B:
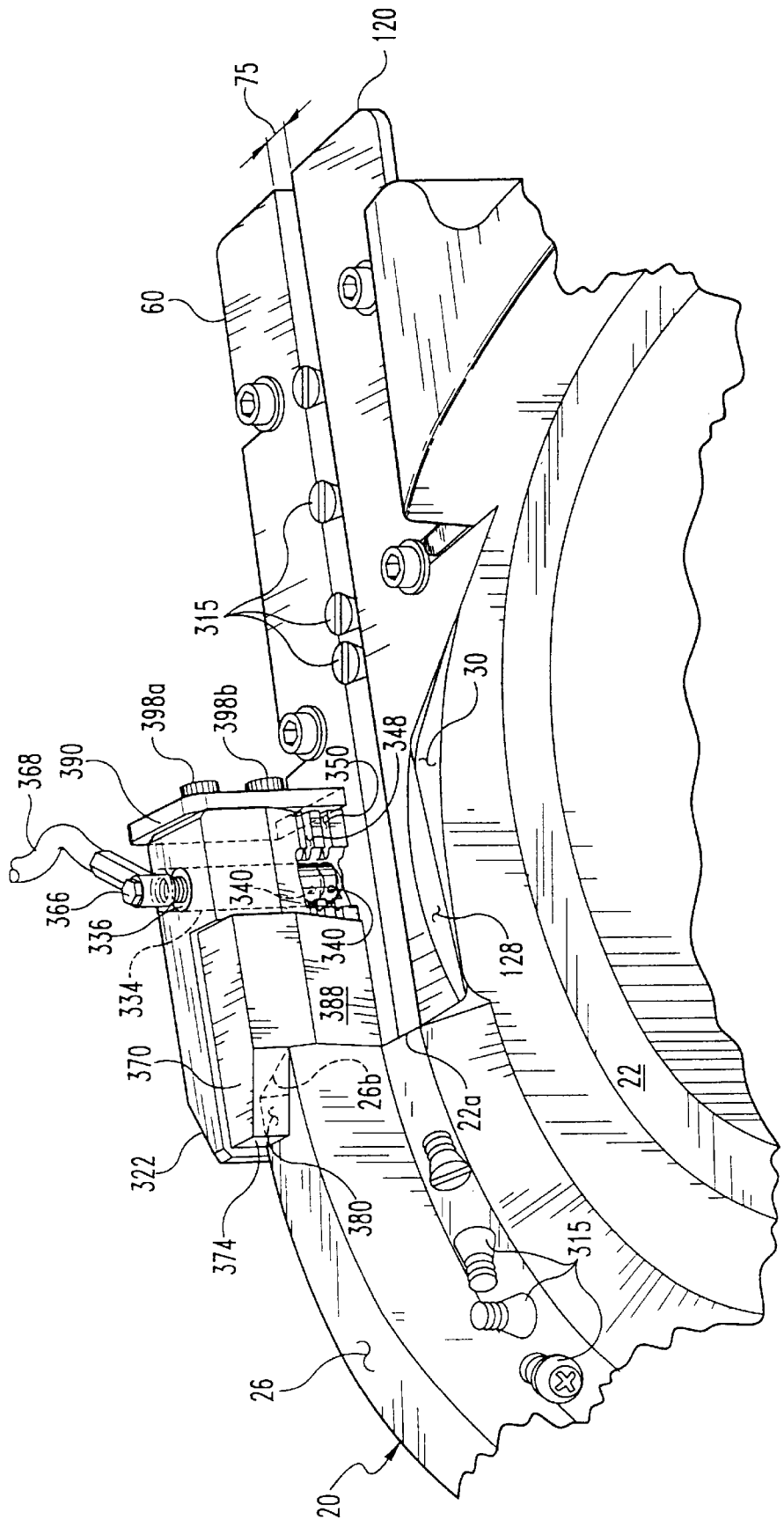
FIG. 15*b* is a view similar to that of FIG. 13 showing further details of the air supply unit of FIGS. 13–15*a*.

Referring specifically to FIGS. 13–15b, parts entrance unit 320 includes an air supply unit 322 connected to an improved guide block 370 which is attached to the parts orientation unit adjacent to the discharge port 22a of vibratory bowl 20. Although FIGS. 13, 15a and 15b show the parts entrance unit 320 as being connected to parts orientation unit 50 of FIGS. 1–4, it is to be understood that entrance unit 320 may be attached to parts orientation unit 300 in a manner identically to that described hereinafter. It should also be understood that air supply unit 322 is shown, and will be described hereinafter, as being used in conjunction with a parts orientation unit (50 or 300) operable to feed and orient elongated and headed parts as is known in the art, although the present invention contemplates utilizing air supply unit 322 with parts orientation unit configurations operable to feed and orient parts having configurations other than headed parts having elongated shafts extending therefrom. In any event, as most clearly shown in FIGS. 14a and 15a, guide block 370 includes a bottom surface 376 having a number of bores, preferably threaded, defined therein. In one embodiment, bottom surface 376 defines two such bores therein; bore 376a and bore 376b. Outer blade 60 of parts orientation unit 50 (alternatively, outer blade 302 of parts orientation unit 300) defines a pair of matching bores 312a and 312b therethrough. A pair of fasteners 378a and 378b extend through bores 312a and 376a, and 312b and 376b respectively, to attached guide block 370 to blade 60 (alternatively, to blade 302) adjacent parts discharge port 22a.

Guide block 370 defines a guide block body 372 having a bowl clamp member 374 extending from one side 378 thereof. Bowl clamp member 374 defines a bottom surface 380 which, when guide block 370 is attached to blade 60 (alternatively, blade 302) as described hereinabove, is in contact with a portion of upper rim 26 of bowl 20 adjacent edge 26b thereof. Preferably, the distance along side 378 between bottom surface 376 and bottom surface 380 of guide block 370 is sized slightly smaller than the distance between the top surface of blade 60 (alternatively blade 302) and upper rim 26 of vibratory bowl 20. As guide block 370 is attached to blade 60 (alternatively blade 302), bottom surface 380 thus forms a press fit against the upper rim 26 of bowl 20. This configuration permits the end of blade 60 (alternatively blade 302) adjacent to parts discharge port 22a to be rigidly clamped to the vibratory bowl 20 adjacent thereto. Preferably, bores 312a, 376a, 312b and 376b are positioned so that side 378 of guide block 370 contacts wall 26a of bowl 20 as bottom surface 380 of guide block 370 contacts upper rim 26 as discussed hereinabove. Since the end of blade 60 (alternatively, blade 302) adjacent to parts discharge port 22a is not otherwise attached to bowl 20 due to the presence of scrap shoot 32, such a clamping arrangement insures that the end of blade 60 (alternatively, blade 302) adjacent to parts discharge port 22a moves only under the direction of vibratory bowl 20, and does not vibrate separately therefrom.

Guide block 370 further defines a guide face 388 which, when guide block 370 is attached to blade 60 (alternatively, blade 302), faces channel 75 (alternatively, gap G). Guide face 388 provides the same function as guide face 86 of guide block 80 shown and described with respect to FIGS. 1–4, and will therefore not be discussed further here.

Guide block 370 further defines a back surface 386 in which a number of bores, preferably threaded, are defined therein. In one embodiment, back surface 386 of guide block 370 defines two such bores therein; a first bore 384a and a second bore 384b. Air supply block 322 defines a back surface 326 and an opposite front surface 328 through which a number of slots are defined. In one embodiment, two such slots, slot 324a and 324b, are defined through block 322. Face 328 of air supply block 322 terminates at face 327 of air supply housing 332, which face 327 extends perpendicularly away from face 328. A pair of fasteners 330a and 330b extend through slots 324a and 324b respectively, and into bores 384a and 384b respectively, to secure air supply block 322 to guide block 370. In so doing, surface 328 of air supply block 322 is in contact with back surface 386 of guide block 370, and surface 327 of guide block 322 is in contact with surface 382 of guide block 370. Slots 324a and 324b provide for the ability to adjust air supply block 322 vertically with respect to guide block 370.

Air supply housing 332 of air supply block 322 has a top surface 325 defining a bore 334 therein. Preferably, bore 334 is cylindrical in shape and has a predefined diameter. An air turret 336, having a diameter slightly less than the diameter of bore 334, is slidably received within bore 334. Preferably, air turret 336 is moveable within bore 334 both longitudinally, as shown by-directional arrow 335, and rotationally as shown by-directional arrow 337. Air turret 336 defines a bore 338, preferably threaded, longitudinally therein, and a smaller bore 340 transverse to the direction of bore 338. Bores 338 and 340 extend sufficiently into air turret 336 to establish fluid communication therebetween. In one embodiment, one such air turret 336 and corresponding bore 334 are provided, although the present invention contemplates providing multiple air turrets and corresponding bores such as air turret 360 and corresponding bore 358 as shown in phantom in FIG. 14a.

In any case, air supply block 322 defines an end face 365 opposite face 327 which defines a number of bores therein. In one embodiment, face 365 defines two such bores, bore 356a and 356b. A stop member, or plate, 390 defines a pair of slots 392a and 392b therethrough, and is attached to face 365 of air supply block 322 via a pair of fasteners 398a and 398b extending through slots 392a and 392b into bores 356a and 356b respectively. Stop member 390 defines a front edge 395 which, when stop member 390 is attached to air supply block 322, faces channel 75 of parts orientation unit 50 (alternatively, gap G of parts orientation unit 300). Slots 392a and 392b permit adjustable positioning of edge 395 toward and away the channel 75 (or gap G).

As most clearly shown in the cross-section of FIG. 14c, air supply housing 332 defines a housing face positioned opposite channel 75 of parts orientation unit 50 (alternatively, gap G of parts orientation unit 300). The housing face of air supply housing 332 defines a first portion 342 extending perpendicularly downwardly from top surface 325. Face 344 extends downwardly from face 342 and inwardly toward air supply housing 332. Face 346 extends downwardly from face 344 in a direction generally parallel to face 342. Face 346 defines a pair of slots, or grooves, 348 and 350 horizontally there across from surface 327 to end surface 365. As most clearly shown in FIGS. 13, grooves 348 and 350 are provided with sufficient depth, and bore 334 is suitably positioned, such that a portion of grooves 348 and 350 extend into bore 334 to provide bore openings 352 and 354 respectively within grooves 348 and 350.

As most clearly shown in FIG. 15a, back surface 326 of air supply block 322 defines a bore, preferably threaded, 362 extending into bore 334 in a direction transverse to the longitudinal axis of bore 334. A set screw 364 extends through bore 362 into contact with air turret 336. By advancing set screw 364 into bore 362, air turret 336 may be secured within bore 334 in any desired position as will be discussed more fully hereinafter. While such a set screw 364 and bore 362 combination is used in one preferred embodiment for securing the position of air turret 336 within bore 334, the present invention contemplates utilizing other clamping techniques for selectively securing air turret 336 within bore 334, the importance of any such technique being that it should be operable to secure air turret 336 in any desired position within bore 334.

In the operation of air supply block 322, an air supply fitting 366 is connected at one end to bore 338 of air turret 336, and at an opposite end to a source of pressurized air via some type of conduit such as a hose 368. As most clearly shown in FIG. 15b, air turret 336 is slidably positionable within bore 334 such that air supply bore 340 is aligned with either groove 350, as shown, or with groove 348 as shown in phantom. The air turret 336 may further be rotatably positioned within bore 334 so that air supply bore 340 is positioned at any desired angle with respect to the longitudinal axis of channel 75 of parts orientation unit 50 (alternatively, gap G of parts orientation unit 300). It is to be understood that air supply bore 340 may be positioned at any angle between that directly opposing parts 315 supplied to parts orientation unit 50 via discharge port 22a as shown in FIG. 15b, and the direction of parts advancing along channel 75 downstream of air supply block 33 as shown in FIG. 15b, thereby encompassing approximately 180° of adjustability. Face 346 of air supply housing 332 is recessed from face 342 in order to decrease the likelihood of parts jamming within the parts orientation unit, as well as the likelihood of parts escaping therefrom. By recessing face 346 within air supply housing 332, and by providing for the attachment of stop plate 390 at end face 365 thereof, an area of air turbulence is created between face 346 and surface 394 of stop plate 390 (see FIG. 14c). Thus, any improperly oriented parts 315 (FIG. 15b) or 317 (FIG. 14c), such as those extending across channel 75, will be directed back into vibratory bowl 20 via such air turbulence.

From the foregoing, it should now be apparent that the air supply block 322 of the present invention provides for a high degree of adjustability of air supply direction. For example, two separate mechanisms are provided for adjusting the height above parts orientation unit 50 (alternatively parts orientation unit 300) at which pressurized air is provided there across. First, air turret 336 may be adjustably positioned within bore 334 to align air supply bore 340 within either of groves 348 or 350. It is to be understood that the present invention contemplates providing any number of such groves within face 346 to provide for either greater or lesser capability for longitudinal adjustment of air supply bore 340 within bore 334. Secondly, the entire air supply block 322 may be adjustably positioned relative to guide block 370 by adjusting the position of fasteners 330a and 330b within elongated slots 324a and 324b of air supply block 322. By either of the foregoing mechanisms or a combination of the two, air supply block 322 may be suitably manipulated to provide a supply of pressurized air across parts orientation unit 50 (alternatively, parts orientation unit 300) at any desired height there above. Moreover, one or more air turrets 336 may be rotationally positioned and secured within its corresponding bore to supply the pressurized air at any angle between approximately zero and 180° relative to the longitudinal axis of channel 75 (or gap G).

Figure 16:
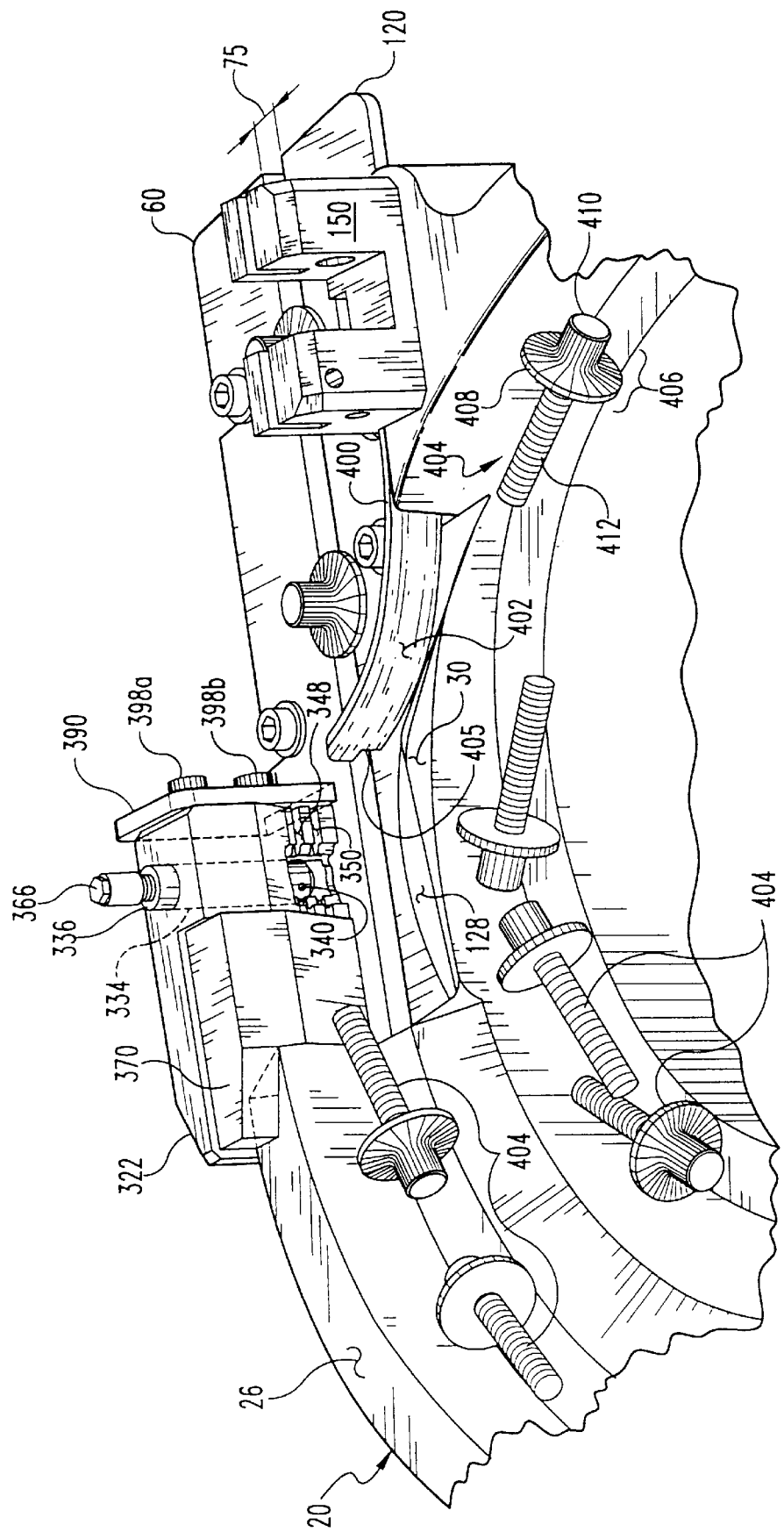
FIG. 16 is a view similar to that of FIG. 15*b* showing another embodiment of the parts receiving unit, in accordance with the present invention.
Figure 17:
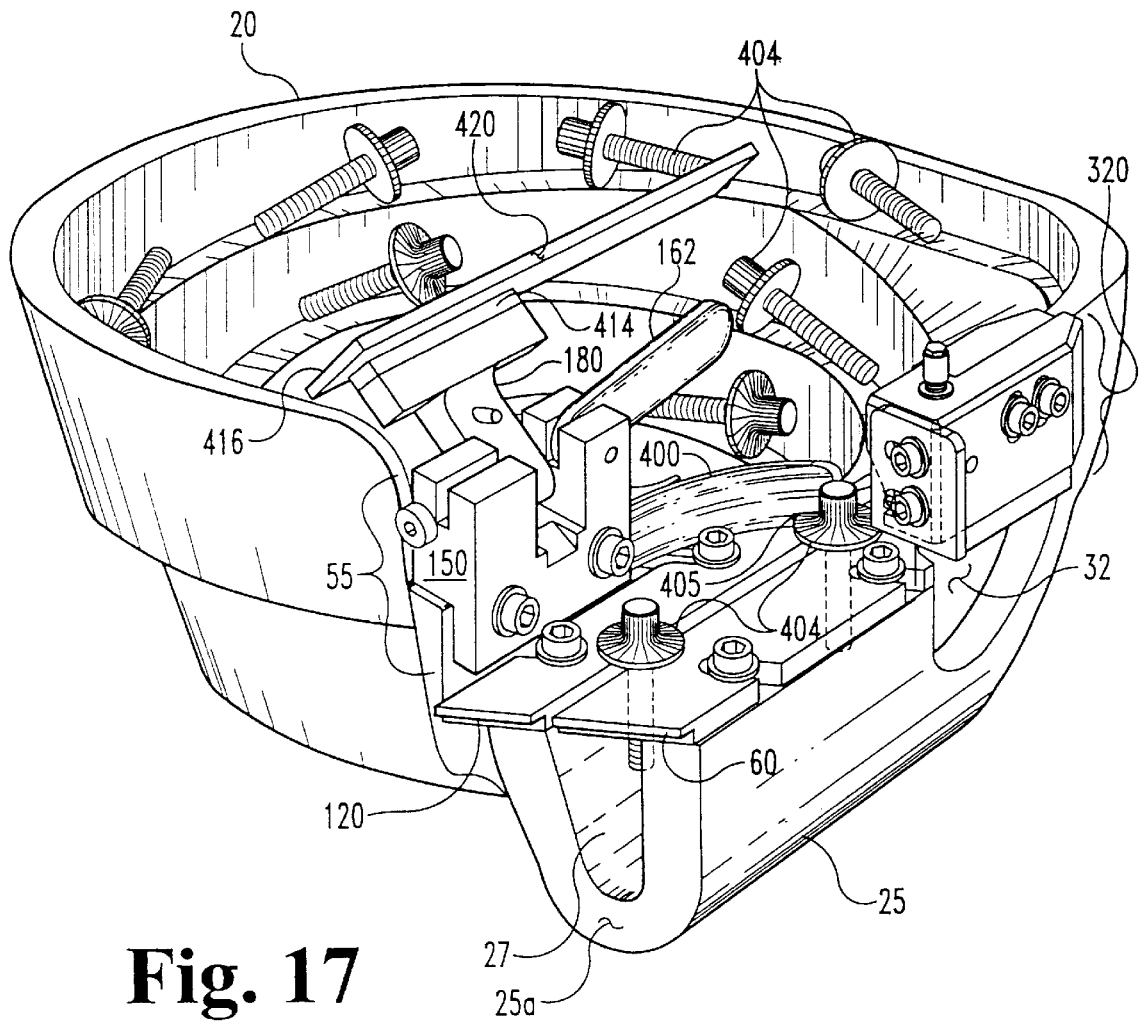
FIG. 17 is a front perspective view of the embodiment shown in FIG. 16.
Figure 18:
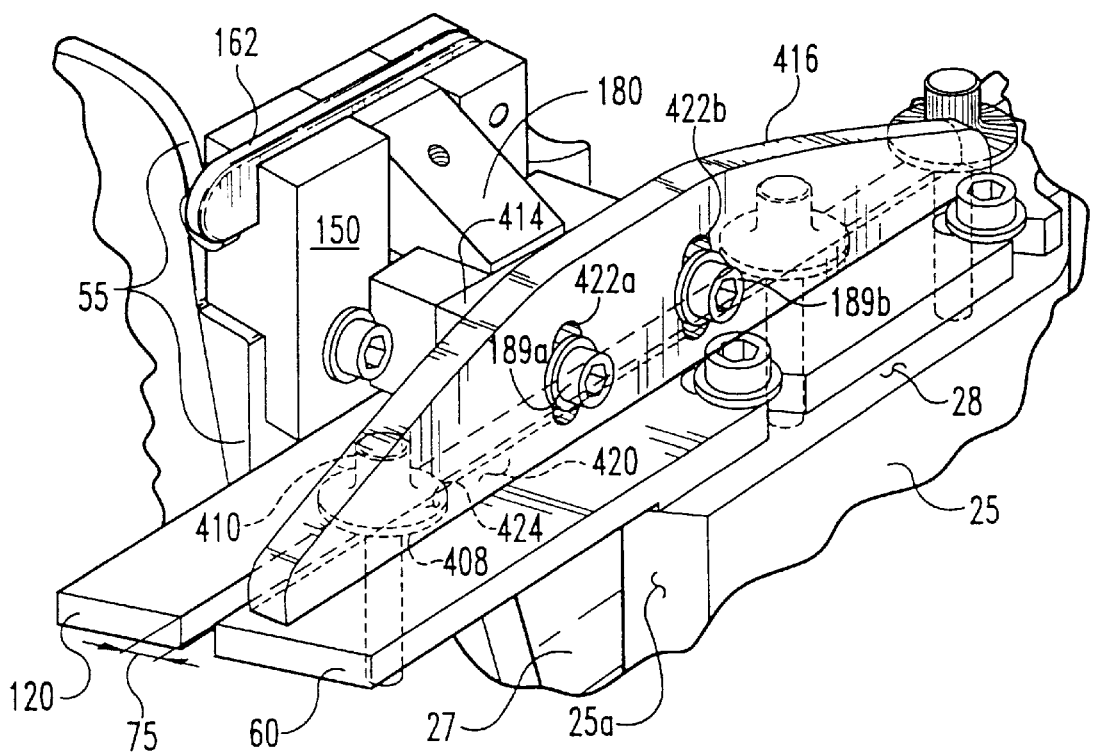
FIG. 18 is a view similar to that of FIGS. 4 and 12 illustrating details of the top confinement member of FIG. 17 in its parts confining position.

Referring now to FIGS. 16–18, alternative embodiments of some of the structural features of either parts orientation unit 50 of FIGS. 1–4 or parts orientation unit 300 of FIGS. 11–12 will now be described. The present invention contemplates providing for the feeding and orientation of a variety of variously configured headed parts. An example of one such headed part 404 is illustrated in FIG. 16 which includes a head portion 406 and an elongated shaft portion 412 extending therefrom. The head portion 406 includes a flange 408 radially extending from a cap portion 410 adjacent to the shaft 412. Such a part 404 includes most of its weight in the head portion 406, and presents unique concerns in the feeding and orientation thereof. For example, if the deflector 140 illustrated in FIGS. 1 and 3 is used with pivotal top confinement apparatus 55, parts 404 may accumulate on the top surface of blade 120 (alternatively, blade 304) adjacent surface 141 of deflector 140 (see FIG. 1) which may then topple over deflector 140 into pivotal top confinement apparatus 55 and eventually cause a parts jam. To address this particular situation, and to otherwise provide an alternatively shaped deflector, another embodiment of a deflector 400 is shown in FIG. 16. As illustrated, the portion of deflector 400 corresponding to the angled portion 144 of deflector 140 is generally sloped or curved rather than providing a distinct angle a relative to the remaining portion of the deflector. Further, this curved feature permits the parts directing surface 402 of deflector 400 to extend to the edge of blade 120 adjacent surface 30 of vibratory bowl 20. Deflector 400 further includes a cutout 405 adjacent to channel 75 (or gap G) for allowing passage of flange 408 therethrough as most clearly shown in FIG. 16. Deflector 400 is thus operable to direct any misoriented parts 404 traveling along the top surface of blade 120 (alternatively, blade 304) back into the vibratory bowl 20. Those skilled in the art will recognize that the use of deflector 400 may be desirable for use with headed parts having configurations other than parts 404.

Referring now to FIGS. 17–18, a modification of pivotal top confinement apparatus 55 is shown which illustrates a technique for providing top confinement at a location other than centrally over the parts orientation channel. Such a technique is particularly well suited for confining parts 404 described hereinabove which have a flange portion 408 radially extending therefrom. In such a case, pivotal top confinement apparatus 55 includes an extension block 414 provided between pivot block 180 and top confinement blade 416. Extension block 414 has sufficient thickness such that the parts confining surface 420 of top confinement blade 416 is disposed over the flange portion 408 of parts 404 with the cap portions 410 positioned between the pivotal top confinement apparatus 55 and the top confinement blade 416. The top confinement blade 416 defines a pair of elongated slots 422a and 422b therethrough and fasteners 189a and 189b extend therethrough, as well as through extension block 414, into engagement with pivoting block 180. The height of confining surface 420 of top confinement blade 416 relative to parts orientation unit 50 (alternatively, parts orientation unit 300) can thus be adjusted by suitably positioning fasteners 189a and 189b within elongated slots 422a and 422b respectively.

It should now be apparent from the foregoing that the pivotal top confinement apparatus 55 need not position the top confinement blade 416 centrally over the parts to be confined, but may rather be offset therefrom as desired to provide for suitable top confinement. Although FIGS. 17–18 illustrate the use of an extension block to position the parts confining surface 420 of the top confinement blade 416 further away from the pivotal top confinement apparatus 55, it is to be understood that pivot block 180 may alternatively be configured to initially position the parts confining surface 420 of top confinement blade 416 between pivotal top confinement apparatus 55 and channel 75, and extension blocks 414 of varying thickness may be subsequently added to move the confining surface 420 away from pivotal top confinement apparatus 55 and across channel 75 as desired.

Figure 9:
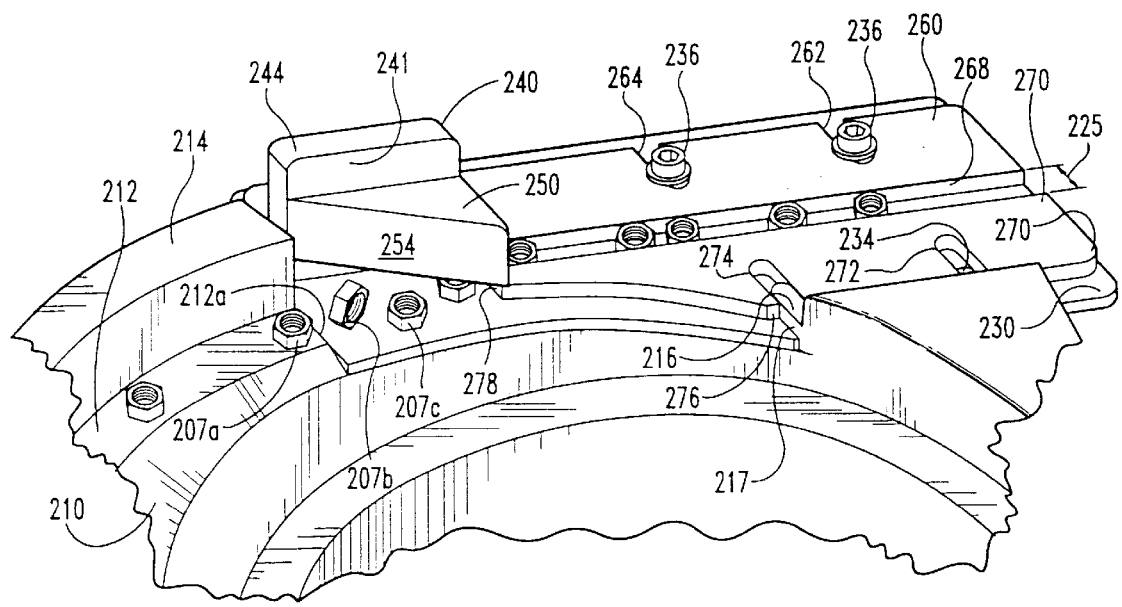
FIG. 9 is a left perspective view of the embodiment shown in FIG. 7, with the pivotal top confinement structure omitted therefrom for clarity, showing details of the parts entrance block and parallel blades.
Figure 19:
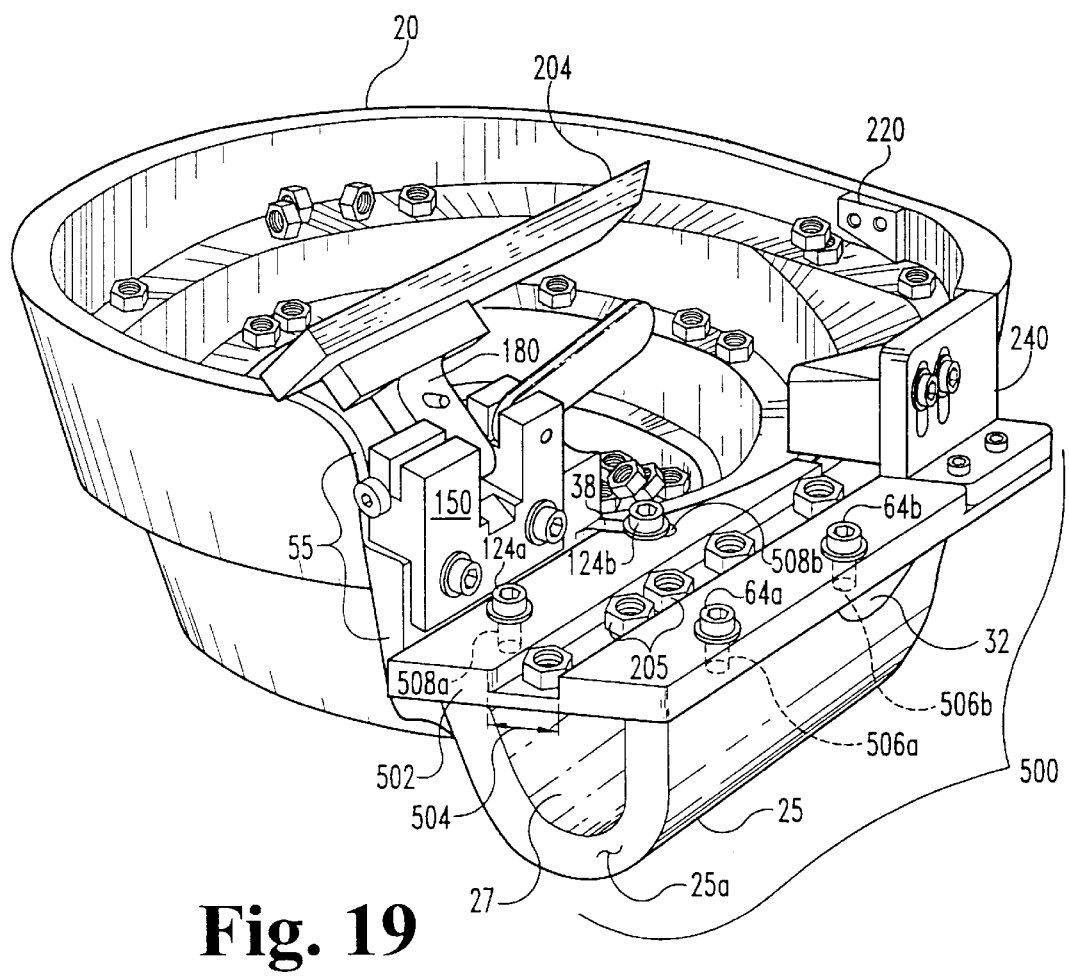
FIG. 19 is a front perspective view of the vibratory bowl of FIG. 10 showing yet another embodiment of parts orientation tooling attached thereto in accordance with the present invention.

Referring now to FIG. 19, another embodiment of a parts orientation unit 500 for use in conjunction with vibratory bowl 20 and pivotal top confinement apparatus 55 of FIG. 10, is shown. Parts orientation unit 500 includes a substantially flat parts orientation tooling unit 502 defining bores 506a, 506b and 508a, as well as channel 508b, therethrough. Bore 506a is aligned with insert 42a, bore 506b is aligned with insert 42b, bore 508a is aligned with insert 44b, and channel 508b is configured to receive projection 38 therein while aligning with insert 44a. Parts orientation tooling unit 502 may thus be attached to surfaces 28 and 30 of parts orientation member 25 via fasteners 64a, 64b, 124a and 124b as discussed hereinabove. Parts orientation tooling unit 502 defines a rectangular channel 504 longitudinally therethrough having a predefined depth and width. The width and depth of channel 504 are appropriately sized to feed and orient low profile parts such as threaded nuts 205, washers, and the like. The remaining components illustrated in FIG. 19 are identical to those previously discussed with respect to FIGS. 7–9, and include top confinement blade 204, sweep 220 and entrance mount 240.

Figure 20:
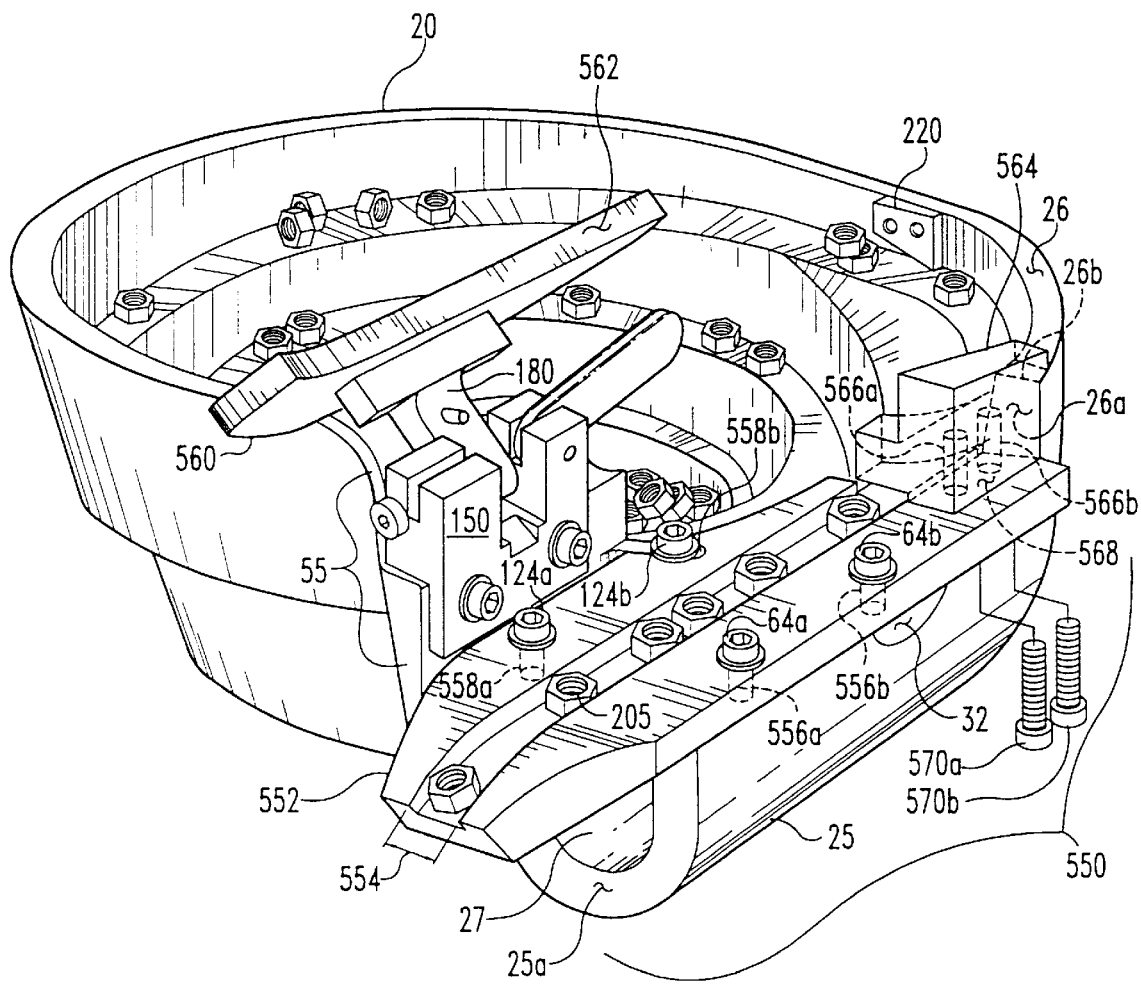
FIG. 20 is a front perspective view of the vibratory bowl of FIG. 10 showing still another embodiment of parts orientation tooling attached thereto in accordance with the present invention.

Referring now to FIG. 20, a modification 550 of the parts orientation unit 500 is shown which includes a parts orientation tooling unit 552 defining bores 556a, 556b, 558a and channel 558b therethrough identical to bores 506a, 506b, 508a and channel 508b of tooling unit 502 respectively. As with tooling unit 502, tooling unit 552 is thus attachable to inserts 42a, 42b, 44a and 44b via fasteners 64a, 64b, 124a and 124b respectively. Tooling unit 552 further defines a rectangular channel 554 longitudinal therethrough having a desired depth and width as discussed hereinabove with respect to channel 504 of FIG. 19. Unlike tooling unit 502, however, tooling unit 552 provides a portion thereof beyond end wall 25a of parts orientation member 25 that is generally curved downwardly with a predefined slope and tapered inwardly toward channel 554. Preferably, tooling unit 552 slopes away from a plane defined by surfaces 28 and 30 of bowl 20 at an angle of approximately 35°, although the present invention contemplates providing the sloped portion of tooling unit 552 at other angles. As with parts orientation unit 300 of FIGS. 11–12, pivotal top confinement apparatus 55 is provided with a top confinement blade 560 having a parts confining surface 562 that is sloped complimentarily to that of tooling unit 552.

Figure 21:
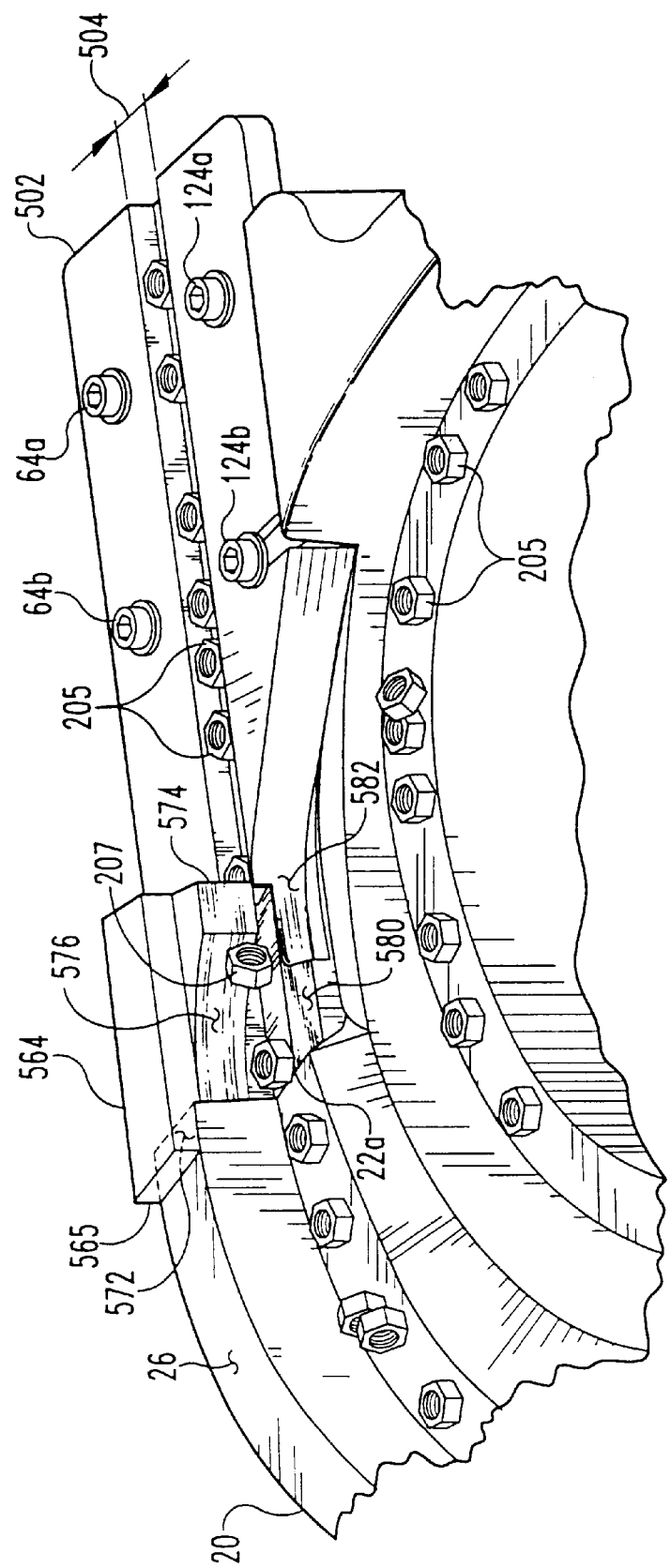
FIG. 21 is a view similar to that of FIGS. 5 and 6 showing the embodiment of FIG. 19 with an alternate entrance block attached thereto, in accordance with another aspect of the present invention.

Referring now to FIGS. 19–21, either of the parts orientation units 500 or 550 may include an alternate entrance block 564 attached thereto. Preferably, tooling units 500 and 552 each define a pair of bores therethrough (not shown) which align with bores 556a and 566b defined in a bottom surface 568 of entrance block 564. Fasteners 570a and 570b thus extend through tooling unit 500 or 550 into bores 566a and 566b respectively to thereby attach entrance block 564 to tooling unit 500 or 550. As most clearly shown in FIG. 21, entrance block 564 preferably includes a clamp member 565 extending therefrom which defines a bottom surface 572 that forms a press fit with upper rim 26 of vibratory bowl 20 when entrance unit 564 is attached to tooling unit 500 or 550. As discussed hereinabove, such a feature insures that the end of tooling unit 500 or 550 extending over scrap chute 32 adjacent to discharge port 22a is secured to vibratory bowl 20.

Entrance unit 564 further includes a projection 574 extending over channel 504 which defines a generally concave vertical face 576 between entrance unit 564 and the end of projection 574. The top surface 580 of tooling unit 500 or 550 between discharge port 22a and protrusion 574 is configured to be level approximately with the bottom of channel 504, and a portion 582 of tooling unit 500 or 550 adjacent to protrusion 574 has been removed. As most clearly illustrated in FIG. 21, parts 205 having orientations other than those aligned with channel 504 are directed back into the vibratory bowl 20. For example, parts standing on end, such as part 207, are directed by concave face 76 into the cutout portion 582 of the tooling unit and back into the interior of vibratory bowl 20. Similarly, flat parts that are not aligned with channel 504 are directed onto surface 580 and into the cutout portion 582 which are thereby directed back into the interior of vibratory bowl 20.

Figure 22:
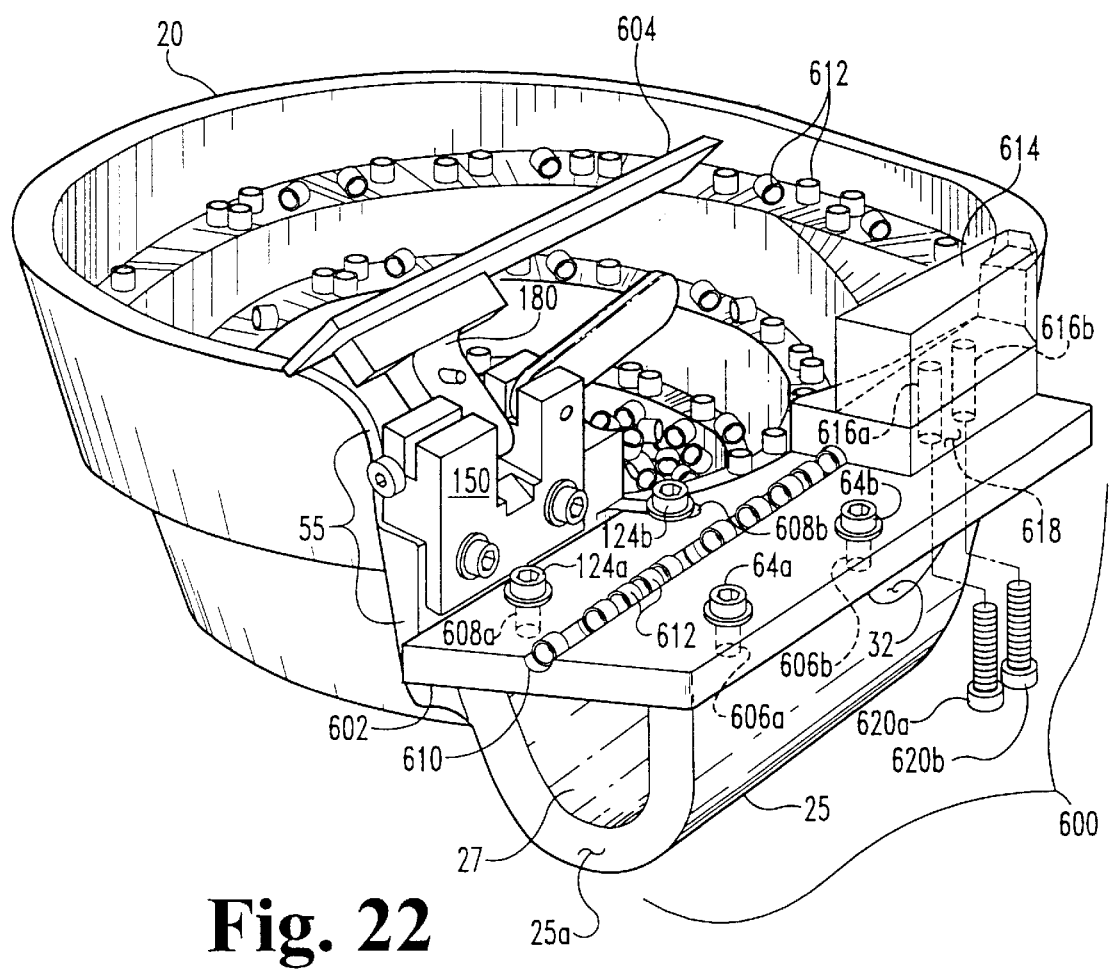
FIG. 22 is a front perspective view of the vibratory bowl of FIG. 10 showing a further embodiment of parts orientation tooling attached thereto in accordance with the present invention.

Referring now to FIG. 22, yet another parts orientation unit 600 for use in conjunction with the vibratory bowl 20 and pivotal top confinement apparatus 55 of FIG. 10 is shown. Parts orientation unit 600 includes a substantially flat parts orientation tooling unit 602 defining bores 606a, 606b, 608a, as well as channel 608b therethrough, which align with inserts 42a, 42b, 44a, and 44b respectively Tooling unit 602 may thus be detachably mounted to surfaces 28 and 30 of parts orientation member 25 via fasteners 64a, 64b, 124a and 124b as discussed hereinabove. Tooling unit 602 defines a generally concave channel 610 longitudinally therethrough for feeding and orienting correspondingly configured parts 612. Concave channel 610 may be symmetrical about a center axis thereof, and may be sized to have a predefined radius. As such, parts 610 may be cylindrical or tubular in shape, with an outer radius complimentary to the radius of channel 610.

Pivotal top confinement apparatus 55 includes a generally flat top confinement blade 604 which may be suitably adjusted as discussed hereinabove to confine parts 612 within channel 610.

Figure 23:
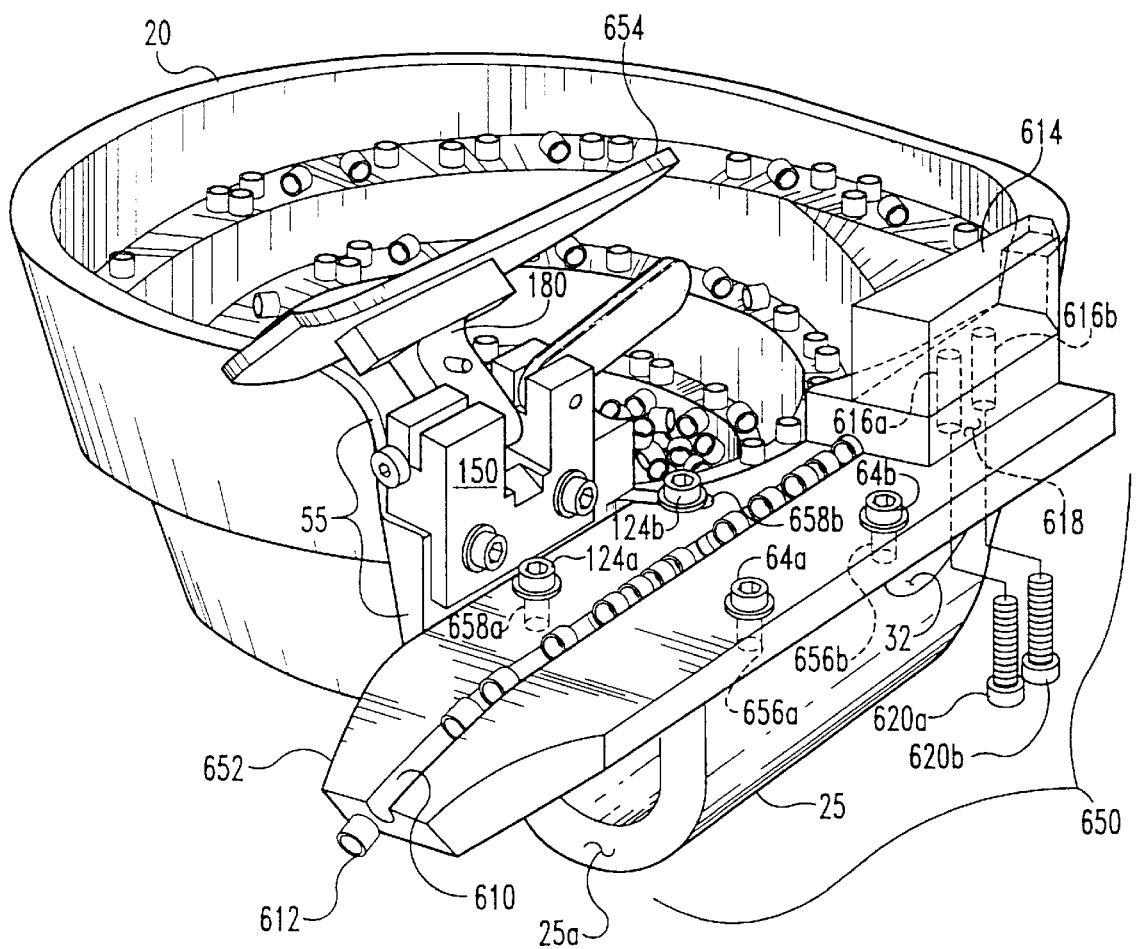
FIG. 23 is a front perspective view of the vibratory bowl of FIG. 10 showing still a further embodiment of parts orientation tooling attached thereto in accordance with the present invention.

Referring now to FIG. 23, a modification 650 of the parts orientation unit 600 is shown which includes a parts orientation tooling unit 652 defining bores 656a, 656b, 658a, as well as channel 658b therethrough. As with tooling unit 600, the bores and channel align with inserts 42a, 42b, 44a and 44b such that tooling unit 650 may be attached to surfaces 28 and 30 of parts orientation member 25 via fasteners 64a, 64b, 124a and 124b. Tooling unit 652 further defines channel 610 longitudinally therethrough, identical to channel 610 of tooling unit 600, for feeding and orienting parts 612. Unlike tooling unit 602, however, tooling unit 652 includes a portion thereof extending beyond end wall 25a of parts orientation member 25 that is sloped generally downwardly away from surfaces 28 and 30 and tapered inwardly toward channel 610. Preferably, this curved portion is sloped at an angle of approximately 35° downwardly from a plane defined by surfaces 28 and 30 of parts orientation member 25, although the present invention contemplates providing this curved portion with other desired angles. As discussed with reference to FIGS. 11–12 and 20, pivotal top confinement apparatus 55 includes a top confinement blade 654 attached thereto which has a parts confining surface configured complimentarily to the curved surface of tooling unit 652.

Parts orientation unit 600 and 650 each define a pair of bores therethrough (not shown) which align with bores 616a and 616b defined in a bottom surface 618 of entrance block 614. A pair of fasteners 620a and 620b extend through tooling unit 602 or 652 into engagement with bores 616a and 616b of entrance unit 614 to thereby attach entrance unit 614 to either of tooling units 602 or 652.

Figure 24:
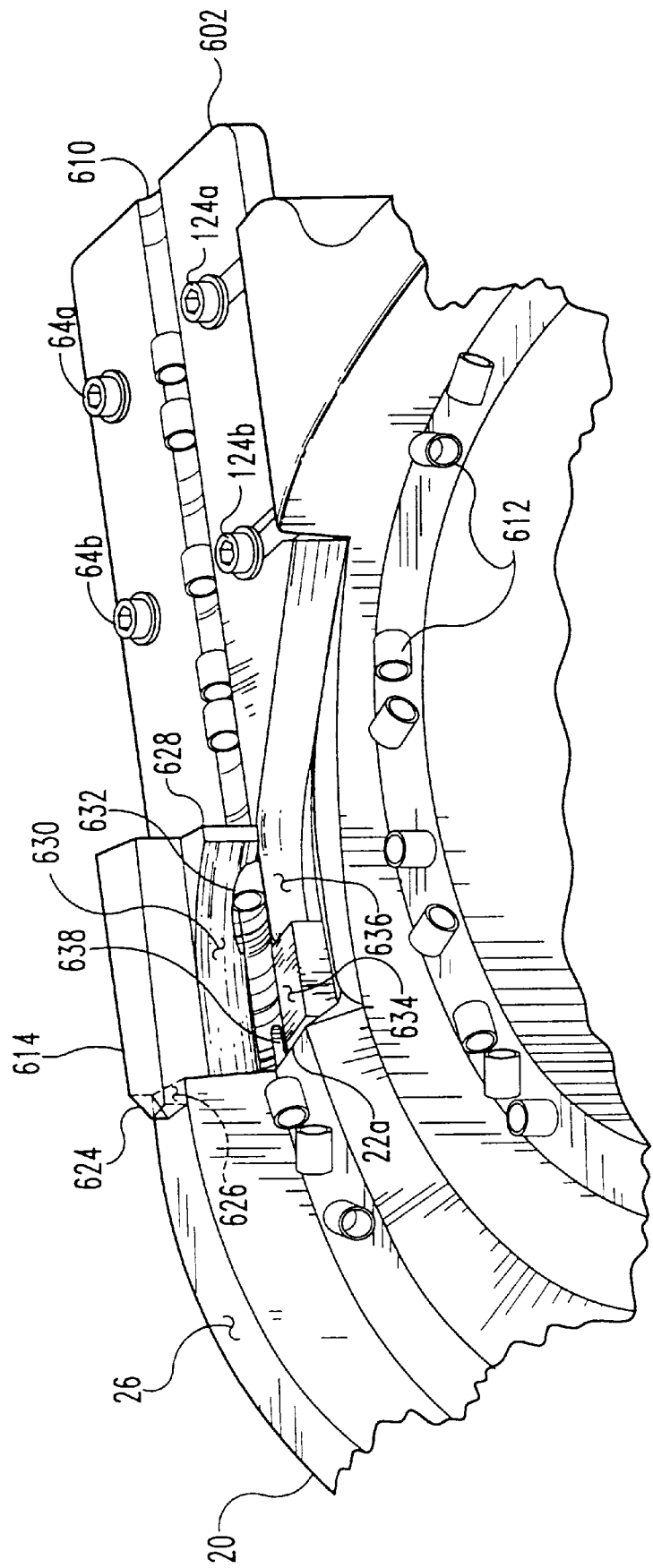
FIG. 24 is a view similar to that of FIGS. 5 and 6 showing further details of the embodiment of FIG. 22.

Referring now to FIG. 24, entrance unit 614 includes a clamp member 624 extending therefrom defining a bottom surface 626 forming a press fit with upper rim 26 of vibratory bowl 20 as entrance unit 614 is attached to tooling unit 602 or 652. In this manner, the end of tooling unit 602 or 652 positioned above scrap chute 32 and adjacent to discharge port 22a is secured to vibratory bowl 20 as discussed hereinabove. Entrance block 614 further includes a projection 628 extending over channel 610 which defines a generally concave surface 630 extending in front of channel 610 adjacent to parts discharge port 22a. Over channel 610, projection 628 defines a recess 632 having a generally concave profile that is shaped complimentarily to the outer surface of parts 612. As discussed with respect to FIG. 21, tooling units 602 and 652 define a surface 634 between discharge port 22a and protrusion 628 that is approximately level with the bottom of channel 610, and further includes a cutout portion 636 adjacent to protrusion 628. As discussed with respect to FIG. 21, the concave surface 630 of protrusion 628, as well as surfaces 634 and cutout portion 636 are operable to direct parts 612 having orientations other than those directly aligned with channel 610, back into the interior of vibratory bowl 20.

Channel 610 further defines a scrap port 638 therethrough adjacent to discharge port 22a that is open to scrap chute 32. Scrap port 638 is operable to direct small scrap particles from parts 612 into scrap chute 32 in order to reduce the presence of scrap particles in and around the parts orientation unit. Although scrap port 638 is shown and described only with respect to channel 610 of FIG. 24, it is to be understood that such a scrap port may be provided within the parts orientation channels of any of the closed channel embodiments discussed herein. Moreover, such a scrap port need not be positioned directly adjacent to discharge port 22a, but may be positioned anywhere along the parts orientation channel so long as such a scrap port is in communication with the scrap chute 32 of vibratory bowl 20.

Figure 25:
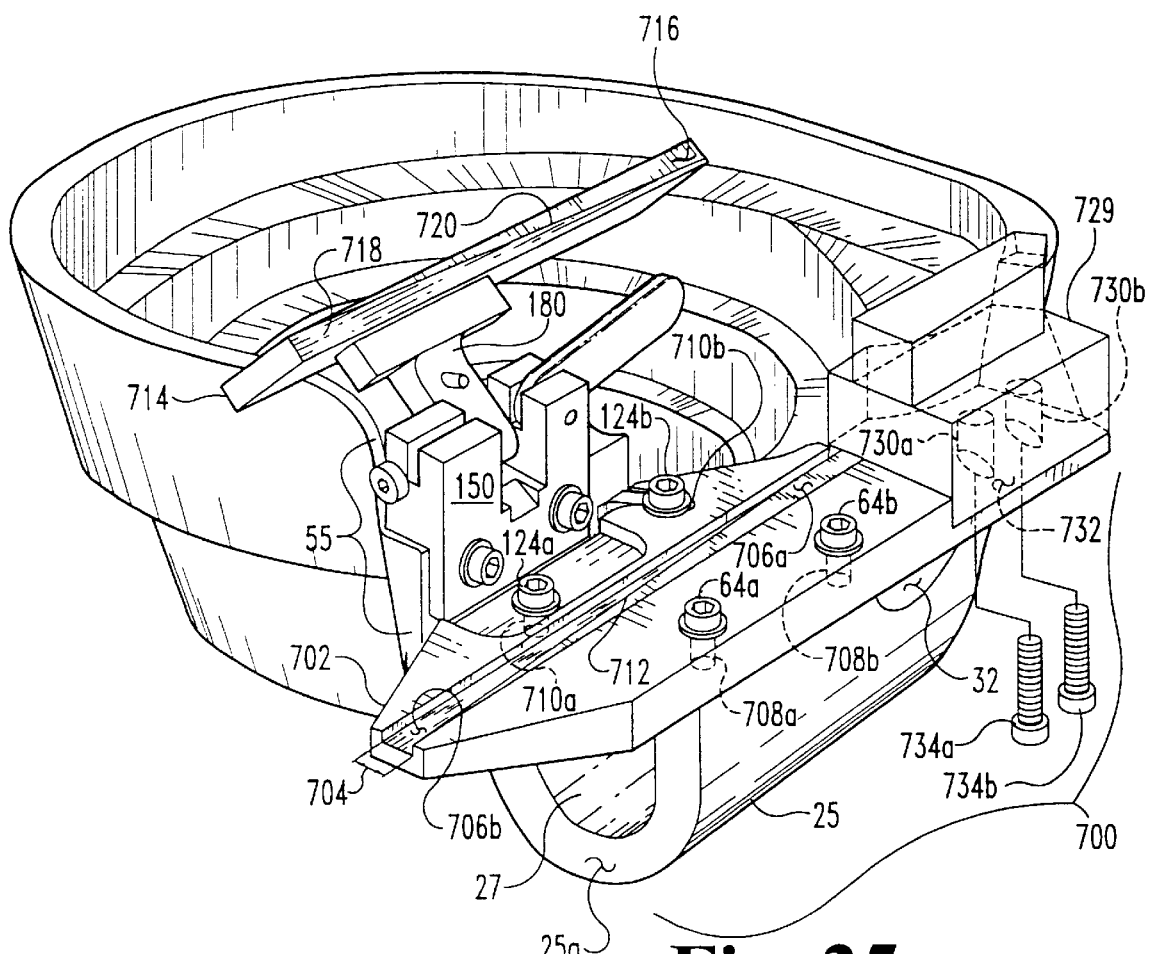
FIG. 25 is a front perspective view of the vibratory bowl of FIG. 20 showing yet a further embodiment of parts orientation tooling attached thereto in accordance with the present invention.

Referring now to FIG. 25, still another embodiment of a parts orientation unit 700, for use in conjunction with the vibratory bowl 20 and pivotal top confinement apparatus 55 of FIG. 10 is shown. Parts orientation unit 700 includes a substantially flat parts orientation tooling unit 702 defining bores 708a, 708b, 710a, as well as channel 710b, therethrough, which align with inserts 42a, 42b, 44a and 44b of surfaces 28 and 30 respectively of parts orientation member 25. Fasteners 64a, 64b, 124a and 124b are thus used to attach tooling unit 702 to parts orientation member 25 of vibratory bowl 20 as discussed hereinabove. Tooling unit 702 defines a rectangular channel 704 longitudinally therethrough having a predetermined depth and width. Channel 704 defines a first channel surface 706a at one end of tooling unit 702 adjacent discharge port 22a and a second channel surface 706b at an opposite end thereof. A diagonal line 712 extends across channel 704 and defines channel surfaces 706a and 706b on either side thereof. Preferably, channel surface 706a is sloped away from pivotal top confinement apparatus 55 in a direction perpendicular to a longitudinal axis of channel 704, and channel surface 706b is generally parallel with a plane defined by surfaces 28 and 30 of vibratory bowl 20. In one embodiment, channel surface 706a is sloped downwardly away from channel surface 706b at an angle of approximately 10° relative thereto, although the present invention contemplates sloping channel surface 706a downwardly away from channel surface 706b at any desired angle. The end of tooling unit 702 adjacent to channel surface 706b is tapered inwardly toward channel 704.

Figure 25A:
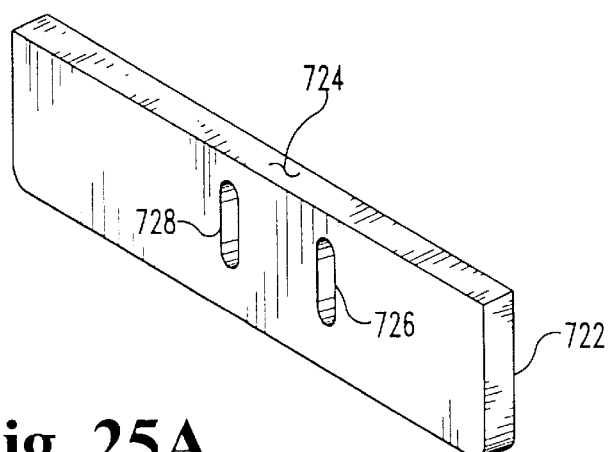
FIG. 25*a* is a perspective view illustrating an alternate embodiment of parts confining surface of the parts confining blade of FIG. 25.

Pivotal top confinement apparatus 55 includes a top confinement blade 714 attached thereto which defines a first parts confining surface 716 adjacent one end thereof, a second parts confining surface 718 adjacent an opposite end thereof, and a diagonal line 720 extending across the parts confining surface of top confinement blade 714 to define surfaces 716 and 718 therebetween. Preferably, parts confining surfaces 716 and 718 of top confinement blade 714 are configured complimentarily to channel surfaces 706a and 706b respectively. Thus, parts confining surface 718 is preferably substantially flat, whereas parts confining surface 716 slopes away from surface 718 at an angle of approximately 10°. An alternative embodiment of top confinement blade 722 is shown in FIG. 25a, which defines a parts confining surface 724 that is sloped perpendicularly away from a longitudinal axis thereof. In one embodiment, parts confining surface 724 is sloped away from pivot block 180 at an angle of approximately 5°. In either case, top confinement blade 714 or 722 define a pair of elongated slots 726 and 728 therethrough for attachment to pivot block 180 as described hereinabove.

Figure 27:
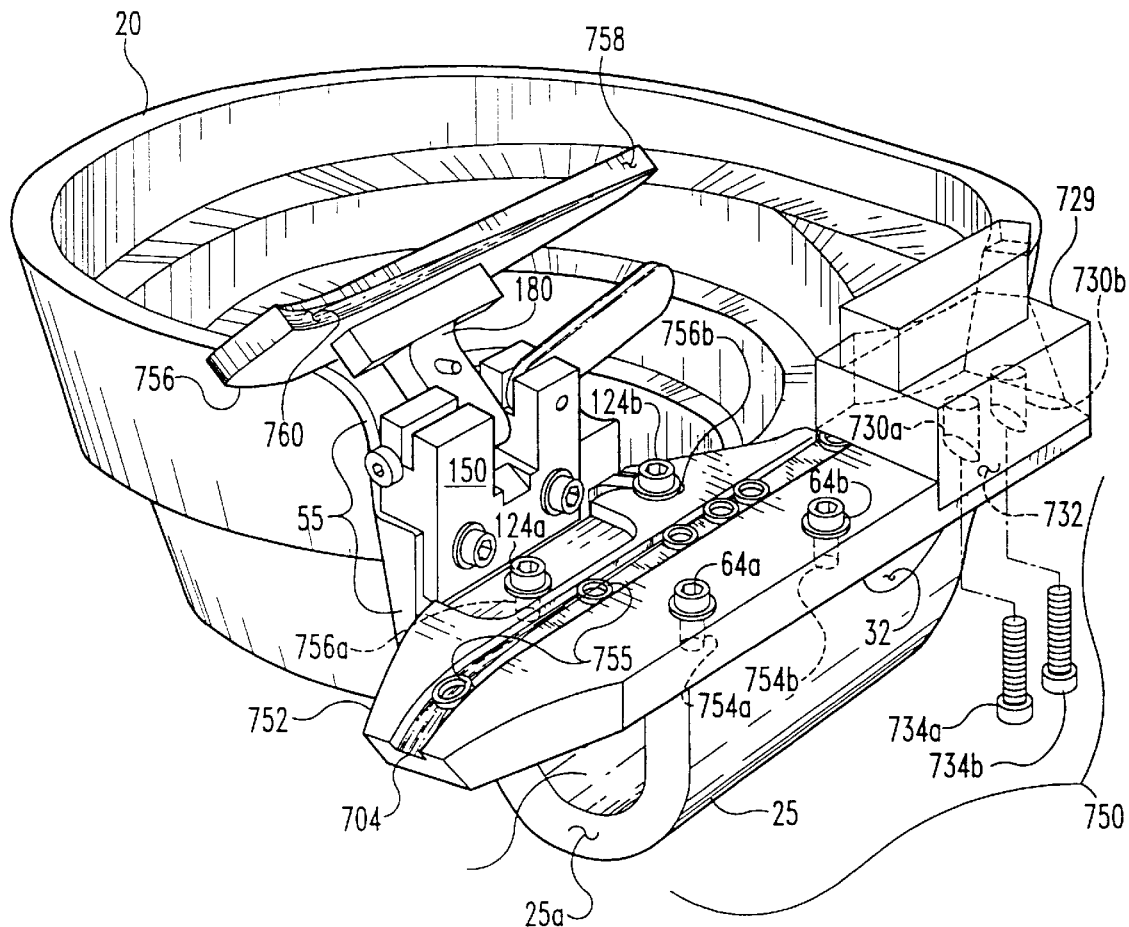
FIG. 27 is a front perspective view of the vibratory bowl of FIG. 10 showing yet another embodiment of parts orientation tooling attached thereto in accordance with the present invention.
Figure 27A:
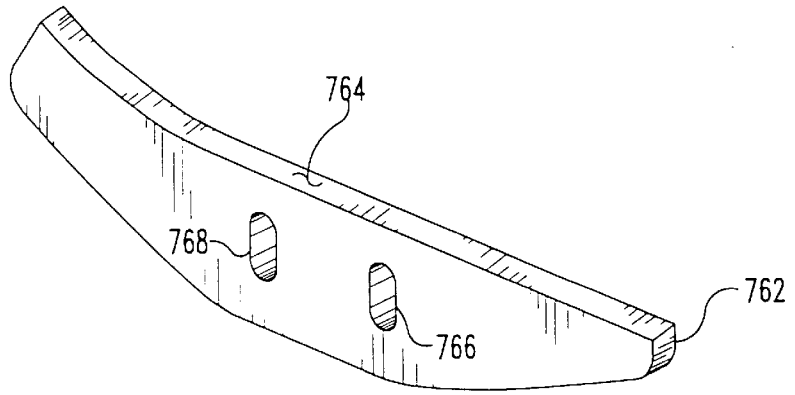
FIG. 27a is a perspective view illustrating an alternate embodiment of parts confining surface of the parts confining blade of FIG. 27.

Referring now to FIG. 27, a modification 750 of the parts orientation unit 700 of FIG. 25 is shown. Parts orientation unit 750 includes a parts orientation tooling unit 752 defining bores 754a, 754b, 756a, and slot 756b, therethrough which align with inserts 42a, 42b, 44a and 44b respectively of vibratory bowl 20. As with tooling unit 702, tooling unit 752 is similarly attachable to surfaces 28 and 30 of parts orientation member 25 via fasteners 64a, 64b, 124a and 124b. Tooling unit 752 further defines a channel 704, identical to channel 704 of tooling unit 702, longitudinally therethrough. Unlike tooling unit 702, however, tooling unit 752 includes a curved portion thereof extending away from end surface 25a of parts orientation member 25 that is sloped generally downwardly at a predefined angle away from a plane defined by a surfaces 28 and 30 of parts orientation member 25 and is tapered inwardly toward channel 704 curved. Preferably, this portion of tooling unit 752 is sloped downwardly at an angle of approximately 35° relative to surfaces 28 and 30, although the present invention contemplates providing such a slope at any desired angle relative to surfaces 28 and 30. Pivotal top confinement apparatus 55 includes a top confinement blade 756 having parts confining surfaces 758 and 760 configured identically to surfaces 716 and 718 respectively of top confinement blade 714 (FIG. 25), wherein surface 760 is further configured complimentarily to the curved surface of tooling unit 752. Alternatively, top confinement blade 762 of FIG. 27A may be attached to pivot block 180 wherein blade 762 defines a parts confining surface 764 configured identically to parts confining surface 724 of top confinement blades 722, yet surface 764 is sloped complimentarily to the top surface of tooling unit 752. In either case, top confinement blade 756 or 764 define a pair of elongated slots 766 and 768 therethrough for adjustable attachment to pivot block 180 as described hereinabove.

Parts orientation units 700 and 750 each include an entrance block 729 attached thereto. Tooling units 702 and 752 each define a pair of bores therethrough (not shown) which align with bores 730a and 730b defined in a bottom surface 732 of entrance block 729. Fasteners 734a and 734b extend through tooling unit 702 or 752 into engagement with bores 730a and 730b respectively to attach entrance block 729 to tooling unit 702 or 752.

Referring now to FIG. 26, entrance block 729 includes a clamp member 738 extending therefrom which defines a bottom surface 740 forming a press fit with upper rim 26 of vibratory bowl 20 as entrance block 729 is attached to tooling unit 702 or 752. In this manner, the end of tooling unit 702 or 752 adjacent to parts discharge port 22a is rigidly secured to vibratory bowl 20 as discussed hereinabove.

Entrance block 729 further includes a projection 742 extending therefrom across channel 704 which defines a generally concave vertical surface 744 extending between discharge port 22a and the end of protrusion 742. Tooling unit 702 or 752 further defines a surface 746 adjacent discharge port 22a that is approximately flat, or parallel to channel surface 706b, and further defines a cutout portion 750 adjacent to protrusion 742 of entrance block 729.

Tooling units 702 and 752 are intended to feed and orient parts having a generally flat and rectangular or square configuration such as, for example, chip resistors 715, chip capacitors and the like. As discussed hereinabove with respect to earlier embodiments, flat surface 746 of tooling units 702 and 752, and concave surface 744 of entrance block 729, are each operable to direct misoriented parts 715 back into the interior of vibratory bowl 20. With the tooling unit 702 or 752, parts that are longitudinally aligned with channel 704 are directed by the vibratory action of vibratory bowl 20 onto sloped channel surface 706a. Sloped surface 706a forces properly aligned parts 715, under the action of gravity, against entrance block 729 as the parts 715 are fed deeper into channel 704. Once past projection 742 of entrance block 729, the channel surface 706a slowly transitions to channel surface 706b that is generally parallel to a plane defined by surfaces 28 and 30 of parts orientation member 25.

In the feeding of parts toward channel 704 from discharge port 22a of vibratory bowl 20, it is possible that parts may orient themselves sideways and yet be forced by channel surface 706a against entrance block 729 as illustrated by part 717. In order that such parts do not cause jams, tooling units 702 and 752 include a cutout area 748 from channel surface 706a adjacent to projection 742. Preferably, cutout 748 is configured in a half-moon shape and extends into channel surface 706a only sufficiently to cause a misoriented part such as part 717 to fall, under the action of gravity, back into vibratory bowl 20. Half-moon cutout 748 is thus operable to remove just enough channel surface 706a so that the weight of a misoriented part 717 causes the part to fall back into the interior vibratory bowl 20.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected. For example, while only some of the parts orientation tooling units are shown and described herein as defining an end thereof opposite to the end positioned adjacent to the parts discharge port that tapers inwardly toward the parts orientation channel, it is to be understood that any parts orientation tooling unit contemplated by the present invention may be so configured. In some cases, such a tapered configuration may significantly reduce the weight of the parts orientation tooling.

What is claimed is:

1. In combination:
   a vibratory bowl configured to receive a disoriented mass of parts therein and transport said parts to a discharge port of said bowl under vibratory action;
   an orienting apparatus mounted to a parts feeding member of said bowl adjacent to said discharge port, said orienting apparatus receiving parts having a number of orientations from said discharge port and serially providing said parts along a parts orientation track of said orienting apparatus with a predetermined orientation; and
   an air supply unit comprising:
   a housing having a front surface facing the parts orientation track, said housing defining a bore therein and an opening in said front surface in fluid communication with said bore; and
   an air supply member having an air inlet adapted for connection to a supply of pressurized air and an air outlet in fluid communication with said air inlet, said air supply member disposed within said bore with said air outlet alignable with said opening, said air supply unit operable to supply a stream of pressurized air from said air outlet across the parts orientation track to direct parts having orientations different from the predetermined orientation back into the vibratory bowl, said air outlet adjustably positionable within said bore to supply said stream of pressurized air across the parts orientation track at any angle within a range of angles relative thereto.

2. The combination of claim 1 including means for adjustably positioning a height of said air outlet relative to the parts orientation track of the orienting apparatus.

3. The combination of claim 1 wherein said air supply member includes a cylindrical air turret rotatably positionable within said bore to thereby position said air outlet at any angle within a range of angles relative to the parts orientation track.

4. The combination of claim 3 wherein said housing defines a second bore extending therein, a second opening in said front face in fluid communication with said second bore, and a second air turret having an air inlet adapted for connection to a supply of pressurized air and an air outlet in fluid communication with said air inlet of said second air turret, said second air turret rotatably positionable within said second bore to thereby position said air outlet of said second air turret at any angle within a range of angles relative to the parts orientation track.

5. The combination of claim 3 wherein said housing defines a top surface having said bore extending therein; and wherein said opening extends from said front surface into said bore substantially perpendicularly thereto.

6. The combination claim 5 wherein said front surface of said housing includes a first groove therein extending parallel to the parts orientation track of the orienting apparatus and across said opening.

7. The combination of claim 6 wherein said front surface includes a second groove therein apart from said first groove, said second groove extending parallel to the parts orientation track of the orienting apparatus and across said opening.

8. The combination of claim 7 wherein said air supply unit includes a securing member extending through said housing and securing said air turret within said bore with said air outlet aligned with one of said first and second grooves to thereby position a height of said air stream relative to the parts orientation track of the orienting apparatus.

9. The combination of claim 1 further including a parts stop member mounted to said housing with said opening in said front surface positioned between the discharge port of the bowl and said stop member, said stop member extending past said front surface of said housing toward the parts orientation track of the orienting apparatus, said stop member inhibiting parts having an orientation different than the predetermined orientation from traveling past said air supply member, said air supply member operable to direct said inhibited parts back into the bowl.

10. The combination of claim 9 wherein said stop member includes means for adjusting a position of said stop member relative to said housing.

11. A parts feeding apparatus for providing oriented parts having common configuration, comprising:

a vibratory bowl configured to receive a disoriented mass of parts therein and transport said parts to a discharge port of said bowl under vibratory action;

an orientation unit mounted to said bowl adjacent to said discharge port, said orientation unit receiving parts having a number of orientations from said discharge port and serially providing said parts along a parts orientation track of said orientation unit with a predetermined orientation; and an air supply unit comprising:

a housing disposed adjacent said parts orientation track, said housing defining a substantially cylindrical bore therein extending along an axis; and a substantially cylindrical air turret at least partially disposed within said bore and having an air inlet adapted for connection to a source of pressurized air and having an air outlet in fluid communication with said air inlet, said air turret being rotatable within said bore about said axis to supply a stream of pressurized air across said parts orientation track at any angle within a range of angles relative thereto to direct parts having orientations different than said predetermined orientation back into said bowl.

12. The parts feeding apparatus of claim 11 wherein said housing defines a front surface facing said parts orientation track, said front surface defining at least one opening extending into said bore with said air turret being displaceable within said bore along said axis to position said air outlet at any height within a range of heights above said parts orientation track and align said air outlet with said at least one opening.

13. A parts feeding apparatus for providing oriented parts having common configuration, comprising:

a vibratory bowl configured to receive a disoriented mass of parts therein and transport said parts to a discharge port of said bowl in a first direction under vibratory action, said vibratory bowl defining first and second parallel mounting surfaces with an open channel therebetween adjacent said discharge port and defining a longitudinal axis substantially parallel with said first direction, said bowl defining an outer bowl lip terminating adjacent to said second mounting surface;

a receiving unit mounted to each of said first and second mounting surfaces, said receiving unit including a clamp member mounted thereto adjacent to said discharge port and said second mounting surface and contacting a portion of said outer bowl lip, said clamp member forming a press fit with said outer lip in a direction perpendicular to said longitudinal axis to thereby secure said receiving unit to said bowl adjacent said second mounting surface, said receiving unit receiving parts having a number of orientations from said discharge port and serially providing said parts with a predetermined orientation; and a confining member mounted to said discharge port and confining said parts within said receiving unit in said predetermined orientation.

14. The part feeding apparatus of claim 13 including means for directing a stream of pressurized air generally across said receiving unit in a direction transverse to said longitudinal axis of said open channel, said directing means being operably attached to said clamp member.

15. The parts feeding apparatus of claim 14 including means for adjustably positioning a height of said directing means within a range of heights relative to said clamp member.

16. The parts feeding apparatus of claim 14 including means for positioning said directing means at an angle within a range of angles relative to said longitudinal axis of said open channel.

17. The combination of claim 1 wherein said orienting apparatus includes a clamp member operably mounted thereto adjacent said discharge port and contacting a portion of an upper rim of said bowl, said clamp member forming a press fit with said portion of said upper rim to thereby secure said orienting unit to said bowl.

18. The combination of claim 17 including means for adjustably positioning a height of said air supply unit within a range of heights relative to said clamp member.

19. The combination of claim 1 including means for securing said air supply member within said bore to securely position a height and an angle of said air stream relative to said parts orientation track.

20. The parts feeding apparatus of claim 11 wherein said orientation unit includes a clamp member operably mounted thereto adjacent said discharge port and contacting a portion of an upper rim of said bowl, said clamp member forming a press fit with said portion of said upper rim to thereby secure said orientation unit to said bowl.

21. A combination, comprising:

a vibratory bowl configured to receive a mass of parts therein and transport said parts along a parts supply track under vibratory action;

an air supply member positioned adjacent said parts supply track and having an air inlet adapted for connection to a supply of pressurized air and an air outlet in fluid communication with said air inlet, said air supply member having a longitudinal axis; and a housing having a front surface facing said parts supply track, said housing defining a bore therein and an opening extending from said front surface to said bore, said air supply member being disposed within said bore with said air outlet aligned with said opening, said air supply member being rotatable within said bore about said longitudinal axis to supply a stream of pressurized air from said air outlet across said parts supply track at any angle within a range of angles relative to said parts supply track to direct misoriented parts back into said vibratory bowl.

22. The combination of claim 21 wherein said air supply member is movable along said longitudinal axis to supply a stream of pressurized air from said air outlet across said parts supply track at any height within a range of heights relative to said parts supply track.

23. The combination of claim 21 wherein said air outlet extends in a direction transverse to said longitudinal axis.

24. The combination of claim 21 wherein said opening includes a groove portion defined in said front surface of said housing, said groove portion extending substantially parallel to said parts supply track to supply a stream of pressurized air across said parts supply track.

25. The combination of claim 24 wherein said air supply member is slidable within said bore along said longitudinal axis.

26. The combination of claim 24 wherein said housing is coupled to said vibratory bowl and includes means for adjustably positioning a height of said housing within a range of heights relative to said vibratory bowl.

* * * * *

UNITED STATES PATENT AND TRADEMARK OFFICE
CERTIFICATE OF CORRECTION

PATENT NO.    : 6,129,200
DATED         : October 10, 2000
INVENTOR(S)   : S. Neal Graham Page 1 of 1

It is certified that error appears in the above-identified patent and that said Letters Patent is hereby corrected as shown below:

Column 8,
Line 62, after the word "angle" insert -- α --.

Column 20,
Line 14, after the word "respectively", insert -- , --.

Signed and Sealed this

Ninth Day of October, 2001

*Attest:*

*Nicholas P. Godici*

NICHOLAS P. GODICI
*Attesting Officer*    *Acting Director of the United States Patent and Trademark Office*